US012794239B2

(12) United States Patent
Hayashi

(10) Patent No.: US 12,794,239 B2
(45) Date of Patent: Nov. 10, 2026

(54) POWER CONVERTER AND DETECTION METHOD

(71) Applicant: FUJI ELECTRIC CO., LTD., Kawasaki (JP)

(72) Inventor: Takashi Hayashi, Higashiyamato-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 69 days.

(21) Appl. No.: 19/060,337

(22) Filed: Feb. 21, 2025

(65) Prior Publication Data

US 2025/0192572 A1 Jun. 12, 2025

Related U.S. Application Data

(63) Continuation of application No. PCT/JP2024/008423, filed on Mar. 6, 2024.

(30) Foreign Application Priority Data

Mar. 23, 2023 (JP) ................................ 2023-047190
Mar. 23, 2023 (JP) ................................ 2023-047244

(51) Int. Cl.
*H02J 3/388* (2026.01)
*H02M 7/48* (2007.01)

(52) U.S. Cl.
CPC ............... *H02J 3/388* (2020.01); *H02M 7/48* (2013.01)

(58) Field of Classification Search
CPC ....................................................... H02J 3/388
(Continued)

(56) References Cited

U.S. PATENT DOCUMENTS

2021/0194383 A1 6/2021 Tsuruma et al.
2021/0384735 A1 12/2021 Chen et al.

FOREIGN PATENT DOCUMENTS

JP H10-271689 A 10/1998
JP 4846450 B2 12/2011
(Continued)

OTHER PUBLICATIONS

International Search Report for PCT/JP2024/008423, mailed on May 21, 2024.
(Continued)

*Primary Examiner* — Rexford N Barnie
*Assistant Examiner* — Dru M Parries
(74) *Attorney, Agent, or Firm* — Rabin & Berdo, P.C.

(57) ABSTRACT

A power converter including: a frequency feedback unit configured to apply a transfer function to a frequency, and apply restriction to obtain a processing result; an addition unit configured to add a first amplitude command value related to the voltage at the interconnection point and the processing result, to output a second amplitude command value; an interconnection point voltage amplitude control unit configured to generate an inverter output voltage amplitude command value, based on the second amplitude command value and the voltage at the interconnection point; a voltage output unit configured to generate a three-phase AC voltage, based on a phase for the virtual synchronous generator function and the inverter output voltage amplitude command value; and an islanding operation detection unit configured to detect an islanding operation state. The transfer function includes a second-order polynomial and a first-order monomial of a Laplace operator in a denominator and a numerator thereof.

14 Claims, 19 Drawing Sheets

(58) Field of Classification Search
USPC ........................................................... 307/69
See application file for complete search history.

(56) References Cited

FOREIGN PATENT DOCUMENTS

| | | | |
|---|---|---|---|
| JP | 2013-046503 | A | 3/2013 |
| JP | 2013-172557 | A | 9/2013 |
| JP | 2015-180122 | A | 10/2015 |
| JP | 2019-080476 | A | 5/2019 |
| JP | 2020-078134 | A | 5/2020 |
| WO | 2019/116419 | A1 | 6/2019 |

OTHER PUBLICATIONS

Jun Motohashi, et al., "Islanding detection device for synchronous generators connected to distribution lines (Reactive power fluctuation method)", T. IEE Japan, vol. 119-B, No. 1, 1999; with English translation.

Toyokuni Kato, et al., "Development of an islanding detection device for synchronous generators", T. IEE Japan, vol. 120-B, No. 8/9, 2000; with English translation.

Written Opinion of the International Searching Authority for PCT/JP2024/008423, mailed on May 21, 2024.

Yushi Miura, "Virtual synchronous generator control of inverter to deal with inertia shortage in power grid", IEE Journal, vol. 141, No. 11, 2021; with English translation.

POWER CONVERTER AND DETECTION METHOD

CROSS-REFERENCE TO RELATED APPLICATIONS

This is a continuation application of International Patent Application No. PCT/JP2024/008423 filed Mar. 6, 2024, which claims the benefit of priority to Japanese Patent Application Nos. 2023-047190 and 2023-047244 both filed Mar. 23, 2023, the entire contents of each of which are hereby incorporated herein by reference.

BACKGROUND

Technical Field

The present disclosure relates to a power converter that operates while interconnected with a power system. In particular, the present disclosure relates to the power converter including a function of detecting, in a case of transition to an islanding operation state in which the device is separated from the system during operation, the state.

Description of the Related Art

In recent years, the percentage of inverter power supplies has been increased by increasing renewable energy in power systems, but existing current control inverters are lack of inertia force, and thus there is concern that further increase of the percentage of the inverter power supplies causes a frequency to easily change, resulting in system instability.

As a solution for this issue, an inverter that performs virtual synchronous generator (VSG) control for a function as a synchronous generator is expected. (Japanese Patent No. 4846450, IEEE Journal, Vol. 141 No. 11, 2021, Yushi Miura "Virtual Synchronous Generator Control of Inverters for Lack of Inertia of Power System", Toyokuni Kato, Chihiro Okado, Hitoshi Ito, Masafumi Kokenawa, Shigeo Nomiya "Development of Islanding Operation Detection Device for Synchronous Generator," the transactions of the Institute of Electrical Engineers of Japan. B, No. 7/8, volume 94120 (2000), issues 8 to 9)

Not only an inverter power supply but also a power generation facility interconnected with a system is required to quickly detect, in a case of transition to an islanding operation state where the facility is separated from a system power supply, the state, and cut off power supply to a partial system.

An inverter that performs VSG control fails to detect islanding operation by using a frequency shift method assuming use of PLL used frequently in normal current control inverters, and the like.

A first aspect of the disclosure has been made in view of such a situation, and a first objective of the first aspect is to provide a power converter that can, when the power converter including virtual synchronous generator control has transitioned to an islanding operation state, detect the state.

Incidentally, when system disturbance occurs in a state where a power generation facility is interconnected with a power system, it may be erroneously detected that the power generation facility has transitioned to an islanding operation state.

However, the islanding operation detection method described in Toyokuni Kato, Chihiro Okado, Hitoshi Ito, Masafumi Kokenawa, Shigeo Nomiya "Development of Islanding Operation Detection Device for Synchronous Generator," the transactions of the Institute of Electrical Engineers of Japan. B, No. 7/8, volume 94120 (2000), issues 8 to 9 does not consider countermeasures against such system disturbance.

A second aspect of the disclosure has been made in view of such a situation, and a second objective of the second aspect is to provide a power converter that can accurately detect, even in system disturbance, whether the power converter has transitioned to an islanding operation state.

SUMMARY

A first aspect of the disclosure is a power converter configured to be interconnected with a power system and to perform virtual synchronous generator function, the power converter comprising: a processor, and a non-transitory storage medium having program instructions stored thereon, execution of which by the processor causes the power converter to provide functions of a frequency feedback unit configured to apply a transfer function to one of a frequency in the virtual synchronous generator function, or a frequency of a voltage at an interconnection point of the power converter to the power system, and apply an upper and lower limit restriction to a result of the application of the transfer function, to thereby generate a processing result; an addition unit configured to output, by adding a first amplitude command value related to the voltage at the interconnection point and the processing result, a second amplitude command value; an interconnection point voltage amplitude control unit configured to generate an inverter output voltage amplitude command value, based on the second amplitude command value and an amplitude of the voltage at the interconnection point; a voltage output unit configured to generate a three-phase Alternating Current (AC) voltage, based on a phase for the virtual synchronous generator function and the inverter output voltage amplitude command value; and an islanding operation detection unit configured to detect, responsive to the processing result reaching the upper and lower limit restriction, an islanding operation state in which the power converter is separated from the power system, wherein the transfer function has: a denominator that includes at least a second-order polynomial of a Laplace operator, and a numerator that includes a first-order monomial of the Laplace operator, the polynomial and the monomial being so configured that the denominator is a stable polynomial when the power converter is interconnected with the power system and is an unstable polynomial when the power converter is the in islanding operation state.

A first aspect of the disclosure is a detection method for detecting an islanding operation state of a power converter configured to be interconnected with a power system and to perform virtual synchronous generator function, the power converter being separated from the power system in the islanding operation state, the detection method comprising, performed by the power converter that includes a processor: applying a transfer function to one of a frequency in the virtual synchronous generator function, or a frequency of a voltage at an interconnection point of the power converter to the power system, and applying an upper and lower limit restriction to a result of the application of the transfer function, to thereby generate a processing result; outputting, by adding a first amplitude command value related to the voltage at the interconnection point and the processing result, a second amplitude command value; generating an inverter output voltage amplitude command value, based on the second amplitude command value and an amplitude of the voltage at the interconnection point; generating a three-phase Alternating Current (AC) voltage, based on a phase for the virtual synchronous generator function and the inverter output voltage amplitude command value; and detecting, responsive to the processing result reaching the upper and lower limit restriction, the islanding operation state, wherein the transfer function has: a denominator that includes at least a second-order polynomial of a Laplace operator, and a numerator that includes a first-order monomial of the Laplace operator, the polynomial and the monomial being so configured that the denominator is a stable polynomial when the power converter is interconnected with the power system and is an unstable polynomial when the power converter is in the islanding operation state.

A second aspect of the disclosure is a power converter configured to be interconnected with a power system and to perform virtual synchronous generator function, the power converter comprising: a processor, and a non-transitory storage medium having program instructions stored thereon, execution of which by the processor causes the power converter to provide functions of a frequency feedback unit configured to output a voltage depending on one of a frequency in the virtual synchronous generator function, and a frequency of a voltage at an interconnection point of the power converter to the power system; a reactive power control unit configured to output a first voltage depending on reactive power at the interconnection point;

an output unit configured to apply a first upper and lower limit restriction to a result of addition of a second voltage based on the output of the frequency feedback unit and the first voltage, to thereby output a third voltage;

a first addition unit configured to output, by adding a first amplitude command value related to the voltage at the interconnection point and the third voltage, a second amplitude command value; an interconnection point voltage amplitude control unit configured to generate an inverter output voltage amplitude command value, based on the second amplitude command value and an amplitude of the voltage at the interconnection point; a voltage output unit configured to generate a three-phase Alternating Current (AC) voltage, based on a phase for the virtual synchronous generator function and the inverter output voltage amplitude command value; and an islanding operation detection unit configured to detect, responsive to the third voltage reaching the first upper and lower limit restriction, an islanding operation state in which the power converter is separated from the power system.

Other features of the first and second aspects of the disclosure are made clear by the present description.

According to the first aspect of the disclosure, it is possible to provide a power converter that can, when the power converter including virtual synchronous generator control has transitioned to an islanding operation state, detect the state.

According to the second aspect of the disclosure, it is possible to provide a power converter that can accurately whether the power converter has transitioned to an islanding operation state.

DESCRIPTION OF EMBODIMENTS

First Embodiment

<<Power Conversion Device 2>>

Figure 1:
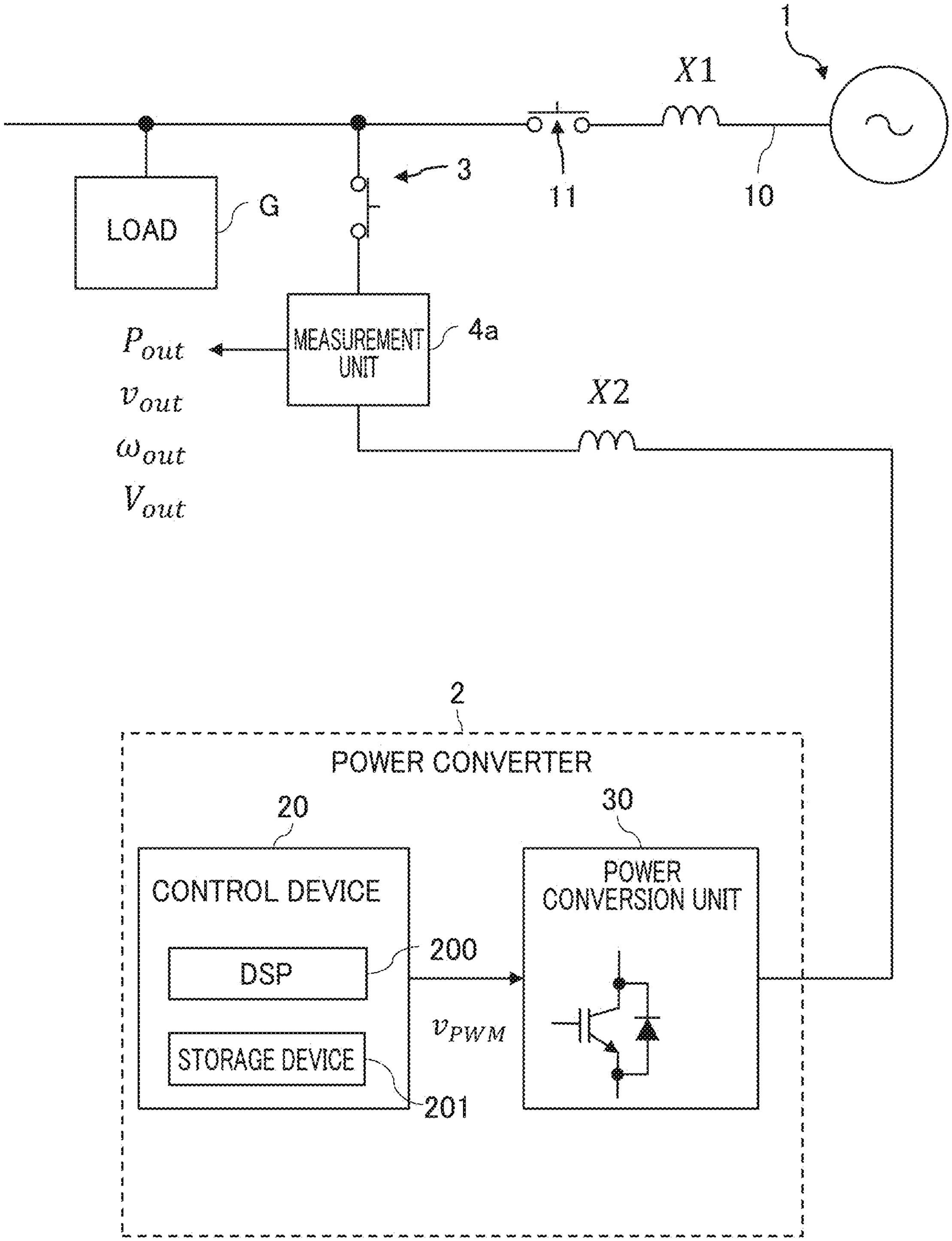
FIG. 1 is a diagram to describe an example of a power system 1 provided with a power converter 2 of a first embodiment.

FIG. 1 is a diagram to describe a power converter 2 interconnected with a power system 1. In the interconnection, a load G is supplied with power from both of the power system 1 and the power converter 2 via a power transmission line 10 having an impedance (reactance) X1.

A circuit breaker 11 released due to an accident or the like causes the power converter 2 to be in an islanding operation state.

A measurement unit 4a is installed between the load G and the circuit breaker 3. The measurement unit 4a measures, in the point of the installation, active power $P_{out}$, a voltage $V_{out}$ (instantaneous value), a frequency $\omega_{out}$, a voltage amplitude $V_{out}$, and the like, which are outputs from the power converter 2, and inputs them into the power converter. Alternatively, the measurement unit 4a measures an instantaneous voltage $V_{out}$ and current $I_{out}$ and inputs them into the power converter 2 to compute $\omega_{out}$, $P_{out}$, and an interconnection point voltage amplitude V.

The power converter 2 is a system interconnection device including a virtual synchronous generator function. Furthermore, the power converter 2 is a device capable of detecting, when the power converter 2 has transitioned to an islanding operation state, the state.

In the islanding operation state, no power is supplied to the load G from the power system 1, and power is supplied to the load G only from the power converter 2.

The point of installation of the circuit breaker 3 is referred to as a "point of interconnection between the power system 1 and the power converter 2" or simply as an "interconnection point." The power converter 2 includes control device 20 and a power conversion unit 30. Assume that an impedance (reactance) X2 between the power converter 2 and the circuit breaker 3 is small, if any.

<Control Device 20>

Hereinafter, a hardware configuration of the control device 20 will be described first, and then a functional block of the control device 20 will be described.

Hardware Configuration of Control Device 20

The control device 20 includes a DSP (Digital Signal Processor) 200 and a storage device 201 (FIG. 1).

{DSP 200}

The DSP 200 implements various functions of the control device 20 by executing a certain program stored in the storage device 201.

{Storage Device 201}

The storage device 201 includes a non-temporary (for example, non-volatile) storage device that stores various data executed or processed by the DSP 200.

The storage device 201 further includes, for example, a RAM (Random-Access Memory) and the like (memory 36*a* described below), and is used as a temporary storage area for various programs, data, and the like.

Functional Block of Control Device 20

Figure 2:
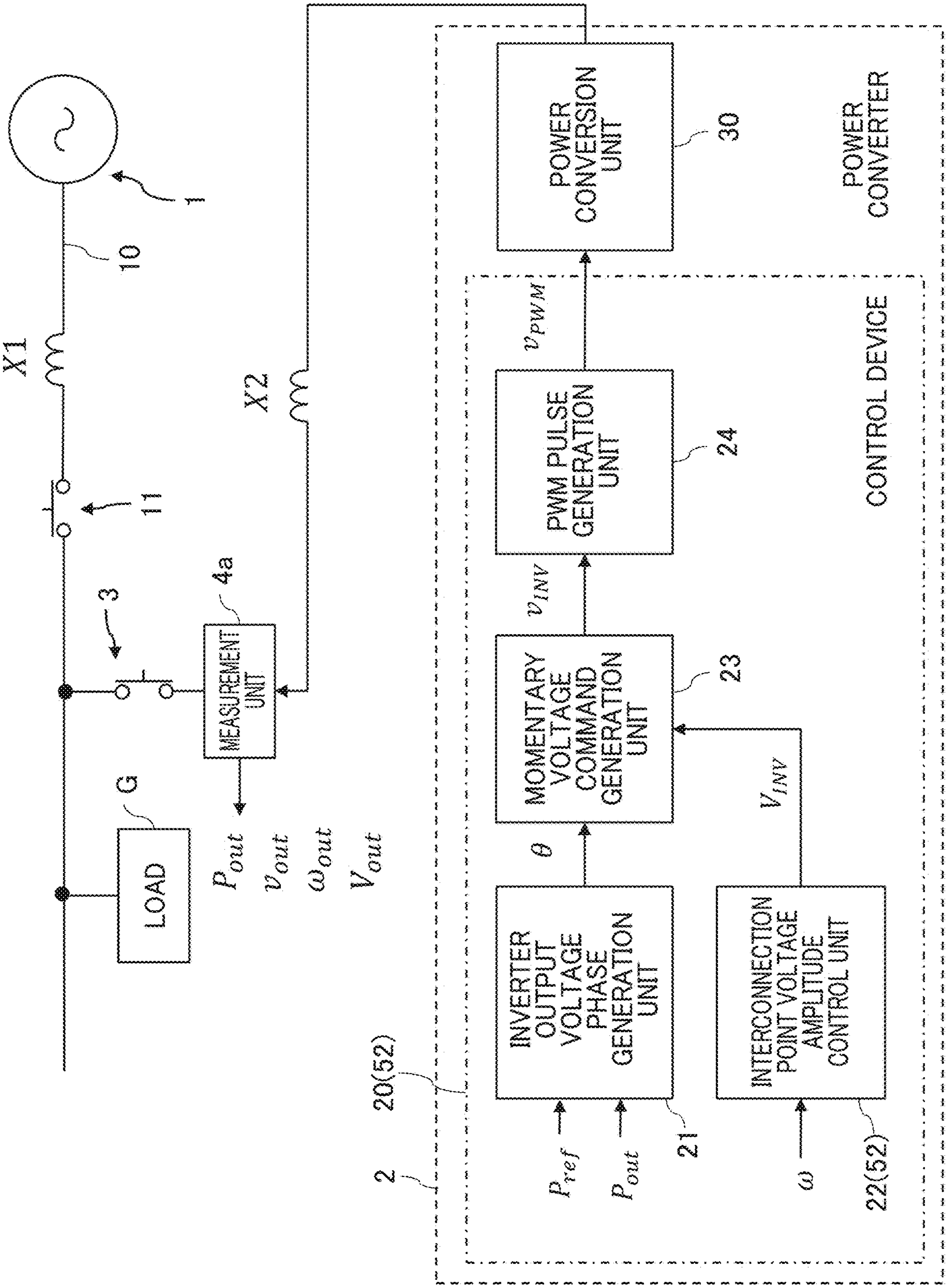
FIG. 2 is a diagram to describe a functional block of a control device 20 of the first embodiment.

FIG. 2 is a diagram to describe the functional block of the control device 20. The control device 20 is a device that controls an active power output and an interconnection point voltage and generates a voltage command value output by the power conversion unit 30.

An inverter output voltage phase generation unit 21, an interconnection point voltage amplitude control unit 22, an instantaneous voltage command generation unit 23, and a PWM pulse generation unit 24 are mounted on the control device 20.

{Inverter Output Voltage Phase Generation Unit 21}

Figure 3:
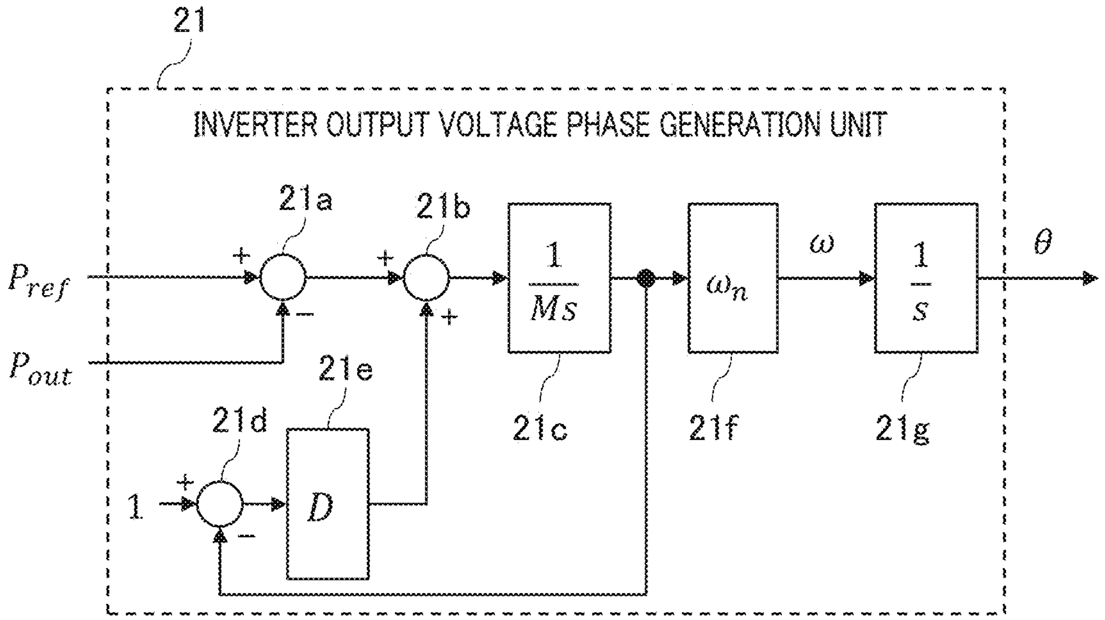
FIG. 3 is a diagram to describe an inverter output voltage phase generation unit 21 of the first embodiment.

FIG. 3 is a diagram to describe the inverter output voltage phase generation unit 21. The inverter output voltage phase generation unit 21 generates a phase θ of an output voltage of the power conversion unit 30, based on virtual synchronous generator control.

Specifically, the inverter output voltage phase generation unit 21 updates a VSG frequency ω, based on a difference between target power $P_{ref}$ output to the power system 1 by the power converter 2 and power $P_{out}$ actually output to the power system 1, and the VSG frequency, and generates the phase θ as an integrated value thereof.

Here, the target power $P_{ref}$ is a value set beforehand by a designer, an operator, or the like of the power converter 2. The power $P_{out}$ is a value measured by the measurement unit 4*a* in FIGS. 1 and 2.

In the following description, an inertia constant and a braking constant of a virtual synchronous generator mounted on the inverter output voltage phase generation unit 21 are M and D, respectively.

As shown in FIG. 3, the inverter output voltage phase generation unit 21 includes adders 21*a*, 21*b*, 21*d*, multipliers 21*e*, 21*f*, and integrators 21*c*, 21*g*.

The adder 21*a* outputs, to the adder 21*b*, a value obtained by subtracting the power $P_{out}$ from the power $P_{ref}$ ($P_{ref}-P_{out}$).

The adder 21*b* outputs, to the integrator 21*c*, a value obtained by adding an input from the multiplier 21*e* (described below) to the input value ($P_{ref}-P_{out}$) from the adder 21*a*.

The integrator 21*c* multiplies the input from the adder 21*b* by 1/M (that is, divides the input by M) and outputs, to the multiplier 21*f*, a result of time integration of the resultant multiplication over a certain period.

The value obtained here by the integration operation is a value obtained by unitizing, by a nominal frequency $\omega_n$, a frequency ω of a voltage output from the power converter 2.

For example, in Japan, the nominal frequency $\omega_n$ is a value obtained by multiplying 50 Hz by 2π in eastern Japan and is a value obtained by multiplying 60 Hz by 2π in western Japan.

The adder 21*d* outputs, to the multiplier 21*e*, a value obtained by subtracting the input from the integrator 21*c* from 1. Note that, here, the input to the adder 21*d* may be a value obtained by dividing, by the nominal frequency $\omega_n$, an interconnection point frequency $\omega_{out}$ measured by the measurement unit 4*a*, in place of the input from the integrator 21*c*.

The multiplier 21*e* outputs, to the adder 21*b*, a value obtained by multiplying the input from the adder 21*d* by the braking constant D of the VSG.

The multiplier 21*f* outputs a value obtained by multiplying the input from the integrator 21*c* by the nominal frequency $\omega_n$. The output value of the multiplier 21*f* is a frequency related to the output voltage of the power converter 2.

The integrator 21*g* computes time integration of the input from the multiplier 21*f* over a certain period. With this computation, the integrator 21*g* outputs a phase θ of the voltage output from the power converter 2.

{Interconnection Point Voltage Amplitude Control Unit 22}

Figure 4:
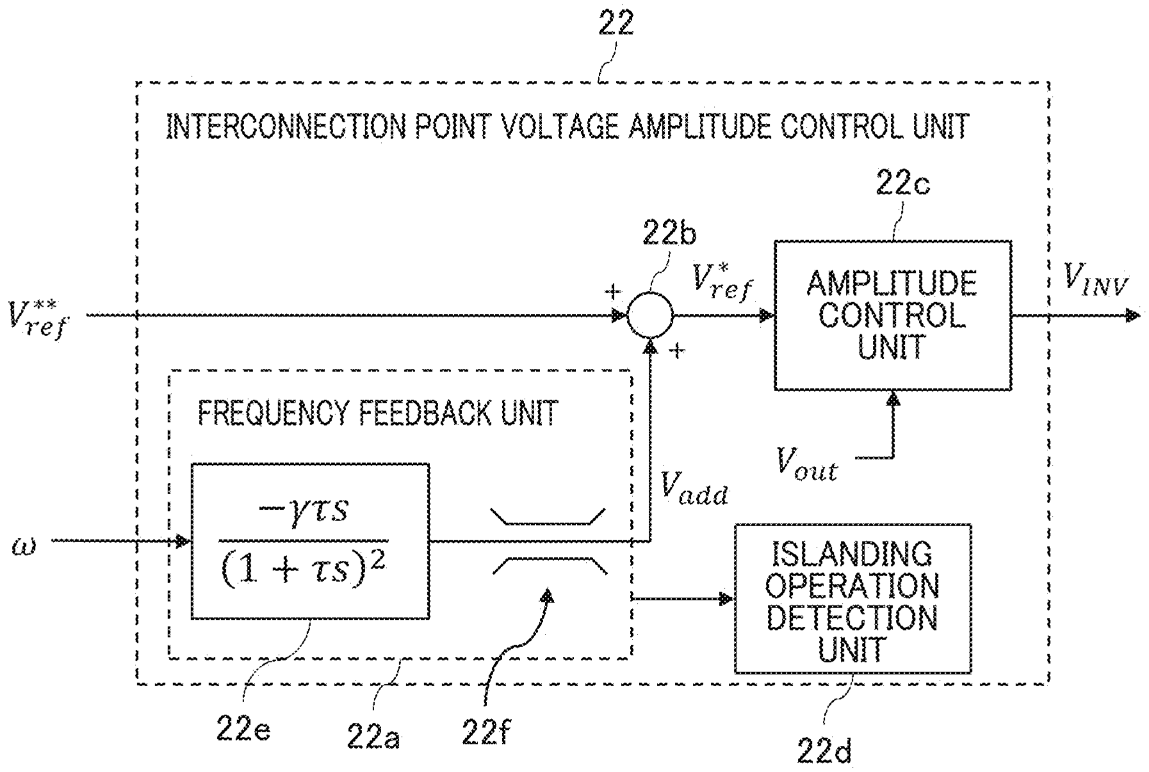
FIG. 4 is a diagram to describe an interconnection point voltage amplitude control unit 22 of the first embodiment.

FIG. 4 is a diagram to describe the interconnection point voltage amplitude unit control 22. The interconnection point voltage amplitude control unit 22 computes an inverter output voltage amplitude command value $V_{INV}$ for controlling an amplitude of the voltage output from the power converter 2. The inverter output voltage amplitude command value $V_{INV}$ corresponds to an amplitude of a voltage actually output from the power converter 2.

Specifically, the interconnection point voltage amplitude control unit 22 outputs the inverter output voltage amplitude command value $V_{INV}$, based on a certain amplitude command value $V_{ref}$ and ω or $\omega_{out}$ that is an output from the multiplier 21***f* of the inverter output voltage phase generation unit 21 (FIG. 3) and that is equal to the output voltage frequency.

The interconnection point voltage amplitude control unit 22 includes a frequency feedback unit 22*a*, an adder 22*b*, an amplitude control unit 22*c*, and an islanding operation detection unit 22*d*.

The frequency feedback unit 22*a* outputs, as a processing result, a signal for identifying whether the power converter 2 is interconnected with the power system 1 or is in islanding operation, based on the frequency ω or the like.

The power converter 2 includes the frequency feedback unit 22*a* and satisfies a condition described below, thereby allowing the power converter 2 to detect, when transitioning to an islanding operation state, the state.

The frequency feedback unit 22*a* outputs, after applying computation of a certain transfer function $G_O$ to a frequency ω or $\omega_{out}$ in the virtual synchronous generator function, a processing result obtained by applying an upper and lower limit restriction to the resultant computation. Note that the "frequency ω in the virtual synchronous generator function" is the frequency of the voltage output from the power converter 2.

In the present embodiment, the following equation is used as a transfer function $G_O$.

$$G_O = -\frac{\gamma\tau s}{(1+\tau s)^2} \quad \text{[Math. 1]}$$

As shown in Equation 1, in the present embodiment, the transfer function $G_O$ includes a numerator being a first-order monomial of a Laplace operator s. The transfer function $G_O$ includes a denominator expressed by a square of a first-order polynomial of a Laplace operator s. The parameters γ and τ are parameters set beforehand by a designer, an operator, or the like of the power converter 2 (described below).

The frequency feedback unit 22*a* includes a computation unit 22*e* and a restriction unit 22*f*. The computation unit 22*e* outputs, to the restriction unit 22*f*, a value obtained by applying computation of the transfer function $G_O$ to the frequency ω or $\omega_{out}$. The restriction unit 22*f* outputs, as an additional voltage $V_{add}$, a processing result obtained by applying an upper and lower limit restriction to the input from the computation unit 22*e*.

If the input from the computation unit 22*e* is a certain lower limit value $V_L$ or greater and is a certain upper limit value $V_U$ or less, the restriction unit 22*f* directly outputs the input from the computation unit 22*e* as the additional voltage $V_{add}$ (following equation).

$$V_{add} = -\frac{\gamma\tau s}{(1+\tau s)^2}\omega \quad \text{[Math. 2]}$$

If the input from the computation unit 22*e* is greater than the upper limit value $V_U$, the restriction unit 22*f* outputs the upper limit value $V_U$ as the additional voltage $V_{add}$ (following equation).

$$V_{add} = V_U \quad \text{[Math. 3]}$$

If a value of an input from the adder 22*b* is less than the lower limit value $V_L$, the restriction unit 22*f* outputs the lower limit value $V_L$ as the additional voltage $V_{add}$ (following equation).

$$V_{add} = V_L \quad \text{[Math. 4]}$$

A condition for determination of the parameters γ and τ on the right-hand side of Equation 1 will be briefly described below. Note that details of the condition will be described below.

The parameters γ and τ are determined such that stability is maintained in system interconnection and instability occurs in an islanding operation state.

The parameters are determined such that instability occurs in an islanding operation state, and thus, in the islanding operation state, the output of 22*e* diverges to $V_U$ or $V_L$.

The parameters γ and τ are determined in such a manner as that described above, thereby allowing the islanding operation detection unit 22*d* described below to detect an islanding operation state when an output from the restriction unit 22*f* reaches the upper limit value $V_U$ or the lower limit value $V_L$.

Referring back to FIG. 4, the adder 22*b* (corresponding to an "addition unit") outputs an interconnection point voltage amplitude command value $V_{ref}$* (corresponding to a "second amplitude command value") obtained by adding a certain amplitude command value $V_{ref}$ (corresponding to a "first amplitude command value") related to a voltage at an interconnection point to the processing result (that is, the additional voltage $V_{add}$) of the frequency feedback unit 22***a*.

In other words, the amplitude command value $V_{ref}$** an interconnection point voltage amplitude command value before the additional voltage $V_{add}$ is added. The interconnection point voltage amplitude command value $V_{ref}$* is an interconnection point voltage amplitude command value after the additional voltage $V_{add}$ is added to the amplitude command value $V_{ref}$**.

The amplitude control unit 22*c* generates an inverter output voltage amplitude command value $V_{INV}$, based on the interconnection point amplitude command value $V_{ref}$* and a voltage amplitude $V_{out}$ at the interconnection point.

In this case, the amplitude control unit 22*c* generates the inverter voltage amplitude command value $V_{INV}$ such that a measured value $V_{out}$ of the voltage amplitude matches the interconnection point amplitude command value $V_{ref}$* at the point of the installation of the measurement unit 4*a*.

When the processing result of the frequency feedback unit 22*a* reaches the upper and lower limit restriction, the islanding operation detection unit 22*d* detects an islanding operation state in which the power converter 2 is separated from the power system 1.

When the islanding operation state is detected, the circuit breaker 3 is released or the power converter 2 is stopped, thereby releasing the power converter 2 from the islanding operation state.

Note that, in the interconnection point voltage amplitude control unit 22 of the present embodiment described above, the input to the frequency feedback unit 22*a* is ω, but the frequency $\omega_{out}$ of the voltage $V_{out}$ measured by the measurement unit 4*a* may be used.

{Instantaneous Voltage Command Generation Unit 23}

Referring back to FIG. 2, the instantaneous voltage command generation unit 23 generates an instantaneous voltage command value $V_{INV}$ for each of three phases for the voltage output from the power converter 2.

{PWM Pulse Generation Unit 24}

The PWM pulse generation 24 unit detects an intersection of a carrier wave realized by, for example, a triangular wave, and a sine wave as a fundamental wave. With this, the PWM pulse generation unit 24 determines a duty ratio of a PWM pulse and generates a PWM pulse signal $V_{PWM}$ having the determined duty ratio.

The PWM pulse signal VPWM is output to the power conversion unit 30, and an inverter circuit of the power conversion unit 30 is driven.

<Power Conversion Unit 30>

The power conversion unit 30 includes a direct-current power supply and an inverter circuit (not shown) including a plurality of switching elements. The inverter circuit converts a DC voltage from the direct-current power supply into an AC voltage and outputs the AC voltage to the power system 1.

In this case, the inverter circuit outputs a voltage generated based on the PWM pulse signal $V_{PWM}$ being an output from the PWM pulse generation unit 24.

When the voltage based on the PWM pulse signal $V_{PWM}$ is output from the power conversion unit 30, voltage $V_{out}$ corresponding to the instantaneous voltage command value $V_{INV}$ being an output of the instantaneous voltage command generation unit 23 is measured by the measurement unit 4*a*.

Note that a combination of the PWM pulse generation unit 24 and the power conversion unit 30 corresponds to a "voltage output unit." In other words, the voltage output unit generates a three-phase AC voltage, based on a phase and an output voltage amplitude in the virtual synchronous generator function.

<Setting of Parameters γ and τ>

The setting of the parameters γ and τ included in the transfer function $G_O$ shown in Equation 1 is briefly described above, but will be described here in detail.

The parameters γ and τ are set based on a characteristic equation related to a closed-loop transfer function $G_C$ in a case where a change in a phase θ being an output of the virtual synchronous generator using active power as an input, a voltage amplitude change being a result obtained by performing computation of a certain transfer function $G_O$ using a frequency ω of the virtual synchronous generator or an interconnection point voltage frequency $\omega_{out}$ as an input, and an active power change caused by the phase change and the voltage amplitude change are collectively regarded as one closed-loop system.

The characteristic equation of the closed-loop transfer function $G_C$ differs between a case where the power converter 2 is interconnected and a case where the power converter 2 is in islanding operation. The characteristic equation in each case will be derived below. Note that, in the derivation of the characteristic equation, assume that the impedance X2 (FIGS. 1 and 2) is sufficiently small and can be ignored. Also, assume that a system frequency is equal to the nominal frequency.

First, consider a case where a frequency ω for the voltage output from the power converter 2 changes by Δω from a rated frequency $\omega_n$.

Accordingly, a change Δθ in a phase of the voltage output from the power converter 2 (equal to a change in a phase difference between the voltage and a voltage from the system) is expressed as the following equation.

$$\Delta\theta = \frac{\Delta\omega}{s} \qquad \text{[Math. 5]}$$

Here, the denominator on the right-hand side is a Laplace operator s.

A change $\Delta P_1$ in active power $P_1$ flowing in the power system 1 caused by the change Δθ in the phase in Equation 5 is expressed as the following equation, if the phase difference is not large.

$$\Delta P_1 = \begin{cases} \frac{V_{out}V_0}{X1}\sin\Delta\theta \approx \frac{V_{out}V_0}{X1}\Delta\theta \\ 0 \end{cases} \qquad \text{[Math. 6]}$$

Here, an upper part and a lower part of the right-hand side correspond to a case of interconnection and a case of an islanding operation state, respectively. In the islanding operation state, the active power $P_1$ flowing in the power system 1 is always 0, and thus the change $\Delta P_1$ is also 0. $V_0$ is an amplitude of a voltage output from the power system 1.

Furthermore, a change $\Delta P_2$ in power consumption $P_2$ in the load G caused by an interconnection point voltage change is expressed as the following equation.

$$\Delta P_2 = \Delta\left(GV_{out}^2\right) \approx 2GV_{out}\Delta V_{out} \qquad \text{[Math. 7]}$$

Thus, when a change ($\Delta P = \Delta P_1 + \Delta P_2$) in active power $P_{out}$ output from the power converter 2 occurs, a frequency change Δω of the following equation occurs in the virtual synchronous generator function.

$$\Delta\omega = -\frac{\omega_n}{Ms + D}\Delta P \qquad \text{[Math. 8]}$$

Furthermore, when the change Δω in the frequency ω of Equation 8 occurs, a change ΔV in the amplitude $V_{out}$ of the voltage is expressed as the following equation by using Equation 1.

$$\Delta V = -\frac{\gamma\tau s}{(1+\tau s)^2}\Delta\omega \qquad \text{[Math. 9]}$$

In consideration of Equations 5 to 9, the characteristic equation of the closed-loop transfer function $G_C$ in a closed loop in each of the interconnection and the islanding operation can be derived as follows.

A characteristic polynomial in the interconnection.

$$(Ms + D)s(1+\tau s)^2 + \omega_n\frac{V_{out}V_0}{X1}(1+\tau s)^2 - 2GV_{out}\omega_n\gamma\tau s^2 \qquad \text{[Math. 10]}$$

A characteristic polynomial in the islanding operation.

$$(Ms + D)(1+\tau s)^2 - 2GV_{out}\omega_n\gamma\tau s \qquad \text{[Math. 11]}$$

A condition for the parameters γ and τ will be derived below by using Equations 10 and 11.

In the interconnection, the parameters are set such that stability is maintained even when the voltage amplitude is changed depending on frequency change.

Accordingly, Equation 10 is required to be a stable polynomial. This requires at least that signs of coefficients with respective orders of a Laplace operator in Equation 10 are all the same.

In Equation 10, the signs of the fourth, third, first, and zero-order coefficients of the Laplace operator s are all positive, but the sign of the second-order coefficient is indefinite.

Accordingly, the following condition is necessary for making the sign of the second-order coefficient of the Laplace operator s in Equation 10 positive.

$$\gamma < \frac{V_0\tau}{2GX1} \qquad \text{[Math. 12]}$$

Furthermore, in the islanding operation, the parameters are determined such that the system becomes unstable.

Accordingly, Equation 11 is required to be an unstable polynomial. This only requires that at least one of coefficients with respective orders of a Laplace operator s in Equation 11 has a sign different from a sign of another coefficient with an order.

In Equation 11, the signs of the third, second, and zero-order coefficients of the Laplace operator s are all positive, but the sign of the first-order coefficient is indefinite.

Accordingly, the following condition is given to make the sign of the first-order coefficient of the Laplace operator s in Equation 11 negative.

$$\gamma < \frac{M + 2D\tau}{2GV_{out}\omega_n\tau} \quad \text{[Math. 13]}$$

To summarize the description above, the parameters γ and τ satisfying the conditions of Equations 12 and 13 are set, thereby maintaining stability in interconnection and leading to instability in an islanding operation state, and thus it is possible to detect islanding operation.

<<Transfer Function $G_O$>>

The present embodiment describes the transfer function $G_O$ by using Math. 1 as an example thereof, but is not limited to this example. A condition to be satisfied by the transfer function $G_O$ will be described in detail.

As shown in the following equation, the transfer function $G_O$ is required to include at least a second-order polynomial of a Laplace operator s in the denominator and a first-order monomial of a Laplace operator s in the numerator.

$$G_O = \frac{bs}{1 + a_1s + a_2s^2 + \ldots + a_ns^n} \quad \text{[Math. 14]}$$

Here, n≥2 and b≠0.

Note that a case where the denominator of the transfer function $G_O$ is a first or lower-order term of a Laplace operator s and a case where the numerator of the transfer function $G_O$ is a zero-order term of a Laplace operator s cannot satisfy the conditions for the stable polynomial and the unstable polynomial described above, although description thereof is omitted.

Here, for example, the closed-loop transfer function $G_C$ in a closed loop with an active power command as an input is formally expressed as the following equation.

$$G_C = \frac{1 + d_1s + d_2s^2 + \ldots + d_ms^m}{1 + c_1s + c_2s^2 + \ldots + c_ls^l} \quad \text{[Math. 15]}$$

Here, l and m are integers. In other words, the denominator is an l-order polynomial of a Laplace operator s, and the numerator is an m-order polynomial of a Laplace operator s.

The transfer function $G_O$ of Equation 14 is given coefficients ($a_1$, $a_2$, . . . , $a_n$, and b) in the polynomial and the monomial such that the denominator of the closed-loop transfer function $G_C$ becomes a stable polynomial in interconnection and becomes an unstable polynomial in an islanding operation state.

In the following example, the transfer function $G_O$ of Equation 14 is assumed to include a denominator being a second-order polynomial (n=2) of a Laplace operator.

In this case, the coefficients ($a_1$, $a_2$, and b) in the polynomial of the denominator and the monomial of the numerator of the transfer function $G_O$ may be set so as to satisfy the following two conditions.

{Case Where Power Conversion Device 2 Is Interconnected With Power System 1}

The characteristic polynomial in this case is expressed as the following equation by defining the transfer function $G_O$ in the description of the above-described embodiment as Equation 14 in place of Equation 1.

$$\left(Ms^2 + Ds + \omega_n\frac{V_{out}V_0}{X1}\right)(a_2s^2 + a_1s + 1) - 2GV_{out}\omega_nbs^2 \quad \text{[Math. 16]}$$

The plurality of coefficients ($a_1$, $a_2$, and b) in Equation 14 are set such that the coefficients of the terms included in the characteristic equation (Math. 16) of the closed-loop transfer function $G_C$ have all the same sign.

This case requires a condition of the following equation in which a sign of the second-order coefficient of a Laplace operator s is positive.

$$M + Da_1 + \omega_n\frac{V_{out}V_0}{X1}a_2 - 2GV_{out}\omega_nb > 0 \quad \text{[Math. 17]}$$

{Case Where Power Conversion Device 2 Is in Islanding Operation}

The characteristic polynomial in this case is also expressed as the following equation by defining the transfer function $G_O$ in the description described above as Equation 14 in place of Equation 1.

$$(Ms + D)(a_2s^2 + a_1s + 1) - 2GV_{out}\omega_nbs^2 \quad \text{[Math. 18]}$$

The plurality of coefficients ($a_1$, $a_2$, and b) in Equation 14 are further set such that in the characteristic equation (Equation 18) of the closed-loop transfer function $G_C$, a term with a sign different from a sign of a coefficient of another term occurs.

This case requires a condition of the following equation in which a sign of the first-order coefficient of a Laplace operator s is negative.

$$M + Da_1 - 2GV_{out}\omega_nb < 0 \quad \text{[Math. 19]}$$

With the transfer function $G_O$ satisfying the conditions (Equations 17 and 19) described above, the power converter 2 can easily detect, when being in an islanding operation state, the state.

{Variation 1}

Figure 5:
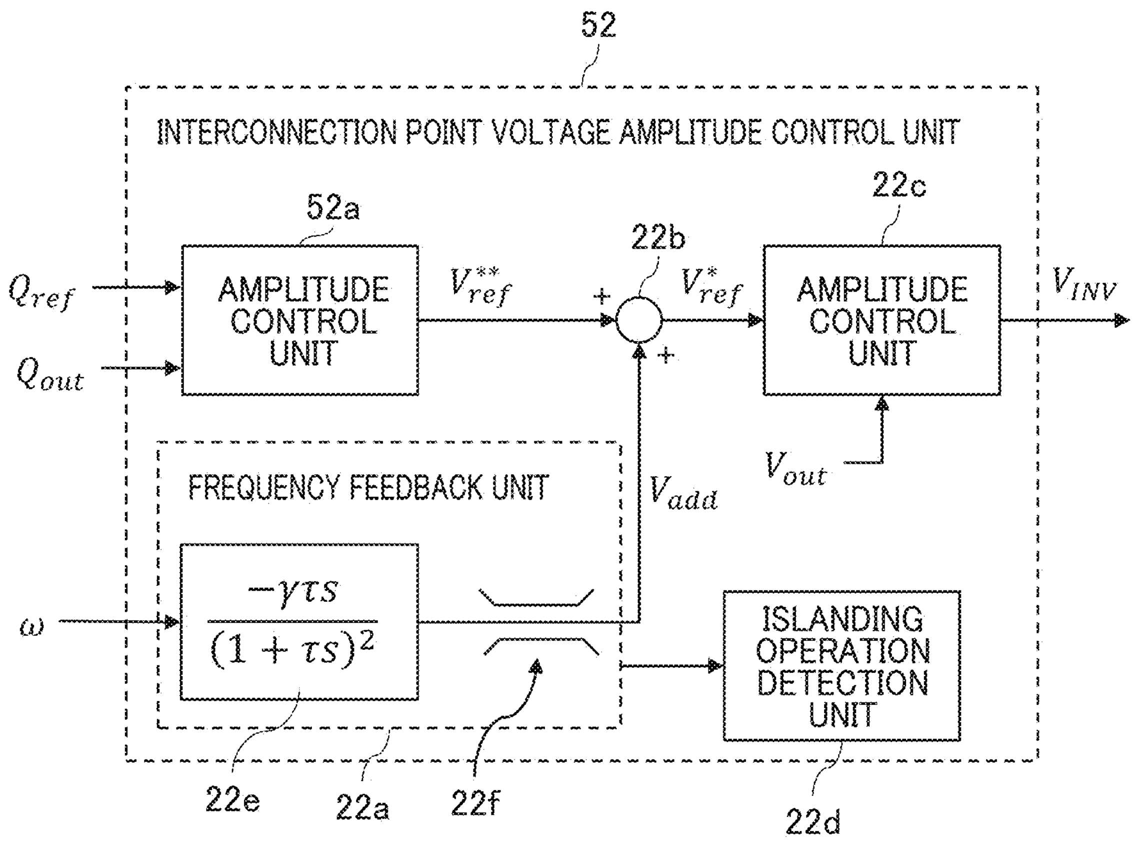
FIG. 5 is a diagram to describe an interconnection point voltage amplitude control unit 52 of Variation 1.

A power converter according to the present variation will be described. FIG. 5 is a diagram to describe an interconnection point voltage amplitude control unit 52 of the power converter according to the present variation.

The power converter according to the present variation differs from the power converter 2 according to the embodiment in that the interconnection point voltage amplitude control unit 52 further includes an amplitude control unit 52*a*.

In the embodiment above, a certain value as the amplitude command value $V_{ref}$ is used as an input to the interconnection point voltage amplitude control unit 22**.

In contrast, in the present variation, the amplitude control unit 52*a* outputs an amplitude command value $V_{ref}$, based on a reactive power command value $Q_{ref}$ output to the power system 1 and reactive power $Q_{out}$ actually output to the power system 1**.

Here, the reactive power command value $Q_{ref}$ is a value set beforehand by a designer, an operator, or the like of the power converter 2, or is a value dynamically set so as to maintain a power factor. The reactive power $Q_{out}$ is a value measured by the measurement unit 4*a* (FIGS. 1 and 2).

As in the present variation, the amplitude command value $V_{ref}$** may be computed. With this, it is possible to detect islanding operation even when performing reactive power control or constant power factor control.

Second Embodiment

<<Power Conversion Device 2>>

Figure 6:
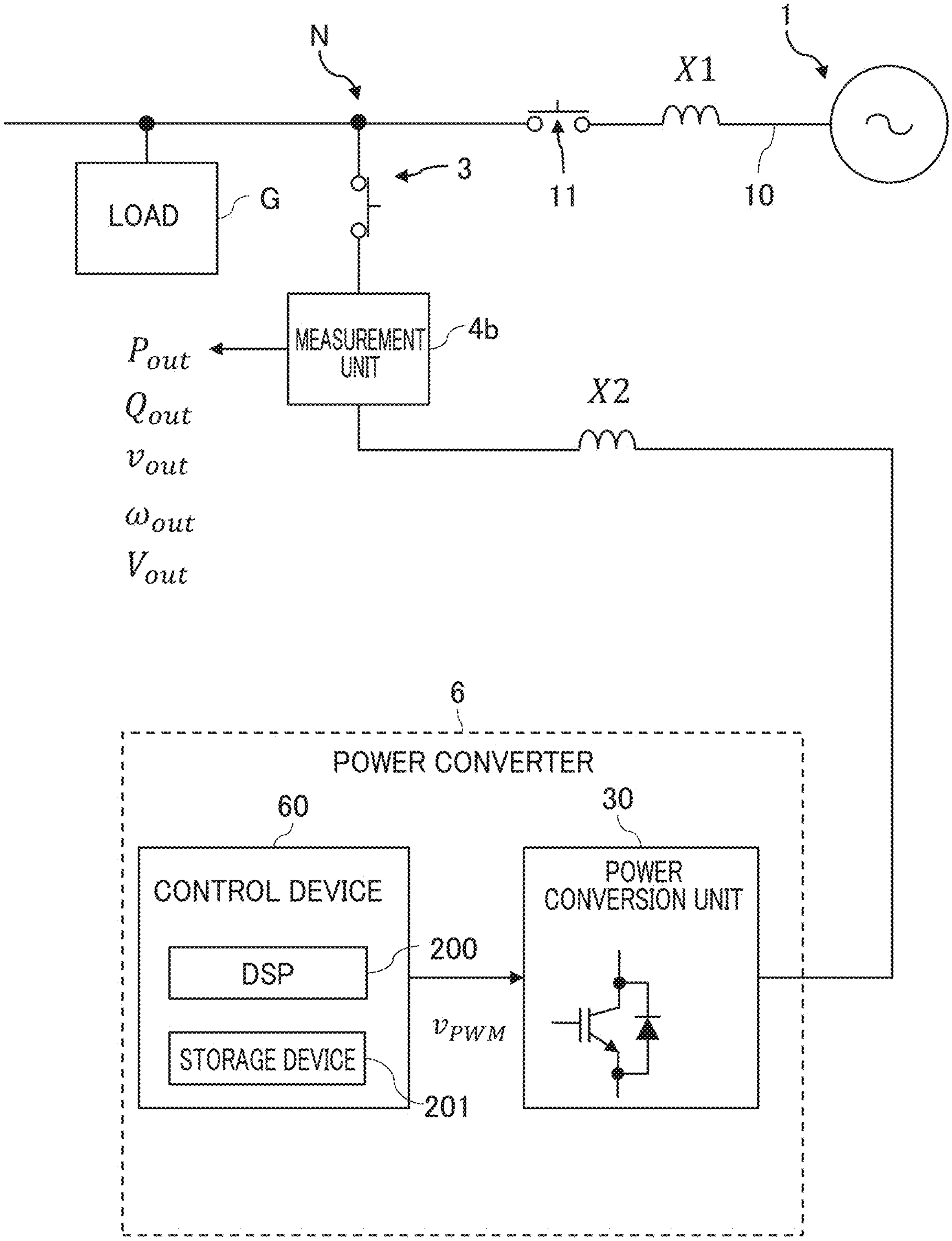
FIG. 6 is a diagram to describe an example of a power system 1 provided with a power converter 6 of a second embodiment.

FIG. 6 is a diagram to describe a power converter 6 interconnected with a power system 1. In the interconnection, a load G is supplied with power from both of the power system 1 and the power converter 6 via a power transmission line 10 having an impedance (reactance) X1. The power transmission line 10 and the power converter 6 are connected with each other in a point of installation of a circuit breaker 3.

A measurement unit 4*b* is installed in front of the circuit breaker 3. The measurement unit 4*b* measures, in the point of the installation, active power $P_{out}$, a voltage $V_{out}$ (instantaneous value), a frequency $\omega_{out}$, a voltage amplitude $V_{out}$, and the like, which are outputs from the power converter 6, and inputs them into the power converter. Alternatively, the measurement unit 4*b* measures an instantaneous voltage $V_{out}$ and current Tout and inputs them into the power converter 2 to compute $\omega_{out}$, $P_{out}$, and an interconnection point voltage amplitude V.

Note that it is assumed that a section between an interconnection point N and the point of the installation of the measurement unit 4*b* is sufficiently short and that an impedance of this section can be ignored. It is assumed that a value measured by the measurement unit 4*b* is regarded as a measured value at the interconnection point N.

The power converter 6 is a device capable of being interconnected with the power system 1 and including a virtual synchronous generator function. Furthermore, the power converter 2 is a device capable of detecting, when the power converter 6 has transitioned to an islanding operation state, the state.

In the islanding operation state, no power is supplied to the load G from the power system 1, and power is supplied to the load G only from the power converter 6.

Assume that an impedance (reactance) X2 between the power converter 6 and the circuit breaker 3 is small, if any.

<Control Device 60>

A functional block of the control device 60 will be described below. Note that a hardware configuration of the control device 60 is the same as that of the power converter 2 of the first embodiment.

Functional Block of Control Device 60

Figure 7:
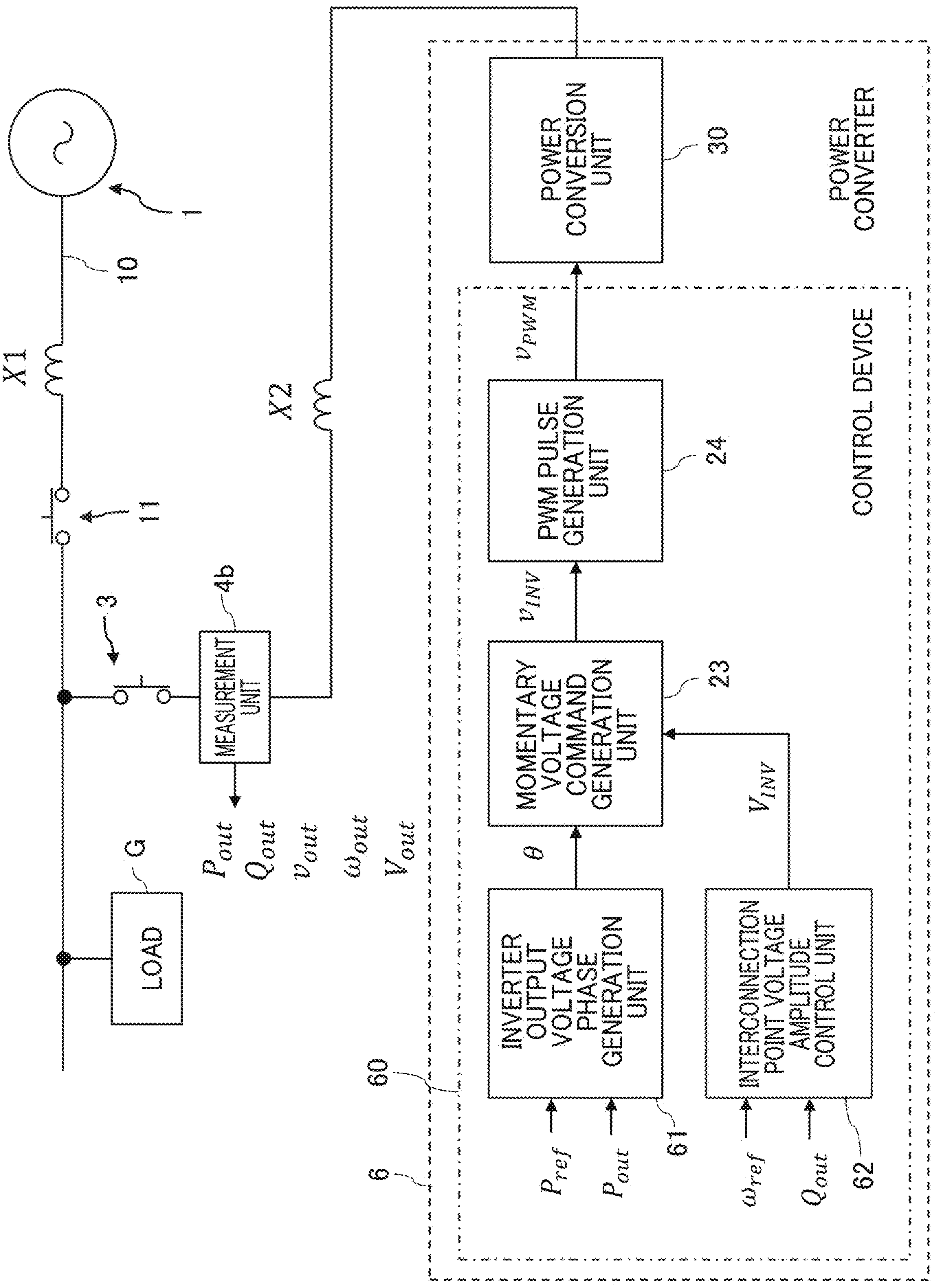
FIG. 7 is a diagram to describe a functional block of a control device 60 of the second embodiment.

FIG. 7 is a diagram to describe the functional block of the control device 60. The control device 60 is a device that controls a voltage output by a power conversion unit 30 described in detail below.

An inverter output voltage phase generation unit 61, an interconnection point voltage amplitude control unit 62, an instantaneous voltage command generation unit 63, and a PWM pulse generation unit 64 are implemented on the control device 60.

{Inverter Output Voltage Phase Generation Unit 61}

Figure 8:
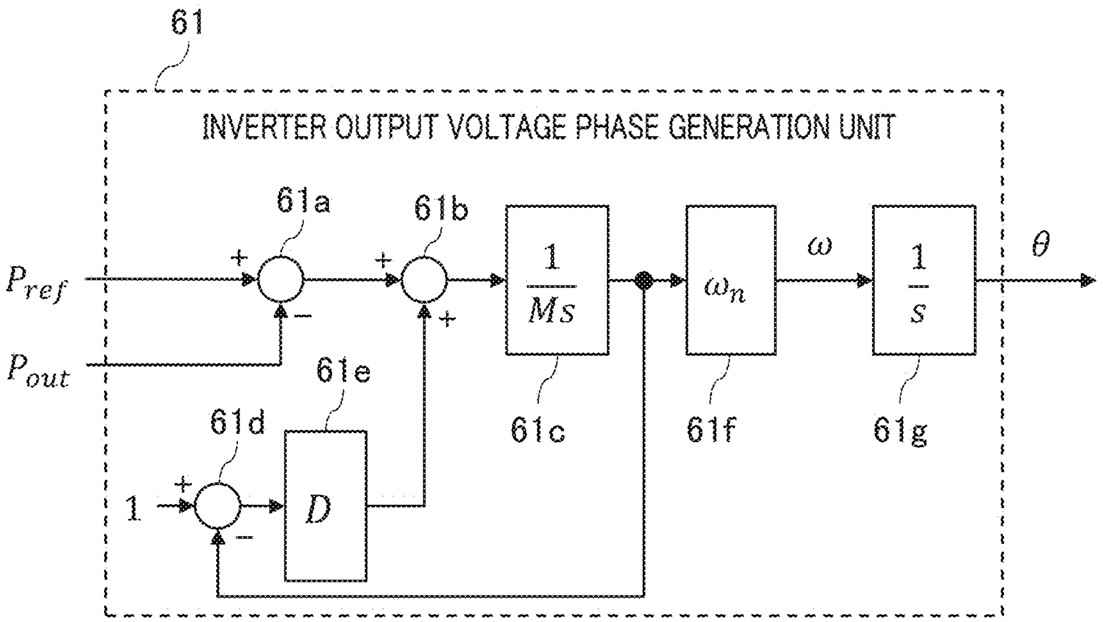
FIG. 8 is a diagram to describe an inverter output voltage phase generation unit 61 of the second embodiment.

FIG. 8 is a diagram to describe the inverter output voltage phase generation unit 61. The inverter output voltage phase generation unit 61 generates a phase θ of an output voltage of the power conversion unit 30, based on virtual synchronous generator control.

Specifically, the inverter output voltage phase generation unit 61 updates a VSG frequency, based on a difference between target power $P_{ref}$ output to the power system 1 by the power converter 6 and power $P_{out}$ actually output to the power system 1, and the VSG frequency, and generates the phase θ as an integrated value thereof.

Here, the target power $P_{ref}$ is a value set beforehand by a designer, an operator, or the like of the power converter 2. The power $P_{out}$ is a value measured by the measurement unit 4*b* in FIGS. 6 and 7.

In the following description, an inertia constant and a braking constant of a virtual synchronous generator mounted on the inverter output voltage phase generation unit 61 are M and D, respectively.

As shown in FIG. 8, the inverter output voltage phase generation unit 61 includes adders 61*a*, 61*b*, 61*d*, multipliers 61*e*, 61*f*, and integrators 61*c*, 61*g*.

The adder 61*a* outputs, to the adder 61*b*, a value obtained by subtracting the power $P_{out}$ from the power $P_{ref}(P_{ref}-P_{out})$.

The adder 61*b* outputs, to the integrator 61*c*, a value obtained by adding an input from the multiplier 61*e* (described below) to the input value $(P_{ref}-P_{out})$ from the adder 61*a*.

The integrator 61*c* multiplies the input from the adder 61*b* by 1/M (that is, divides the input by M) and outputs, to the multiplier 61*f*, a result of time integration of the resultant multiplication over a certain period.

The value obtained here by the integration operation is a value obtained by unitizing, by a nominal frequency $\omega_n$ of the power system 1, a frequency ω output from the power converter 6.

For example, in Japan, the nominal frequency $\omega_n$ of the power system 1 is a value obtained by multiplying 50 Hz by 2π in eastern Japan and is a value obtained by multiplying 60 Hz by 2π in western Japan.

The adder 61*d* outputs, to the multiplier 61*e*, a value obtained by subtracting the input from the integrator 61*c* from 1.

Note that, here, the input to the adder 61*d* may be a value obtained by dividing, by the nominal frequency $\omega_n$, an interconnection point frequency $\omega_{out}$ measured by the measurement unit 4*b*, in place of the input from the integrator 61*c*.

The multiplier 61*e* outputs, to the adder 61*b*, a value obtained by multiplying the input from the adder 61*d* by the braking constant D of the VSG.

The multiplier 61*f* outputs a value obtained by multiplying the input from the integrator 61*c* by the nominal frequency $\omega_n$ of the power system 1. The output value of the multiplier 61*f* is a frequency related to the output voltage of the power converter 6 output to the power system 1.

The integrator 61*g* computes time integration of the input from the multiplier 61*f* over a certain period. With this computation, the integrator 61*g* outputs a phase θ of the voltage output from the power converter 6.

{Interconnection Point Voltage Amplitude Control Unit 62}

Figure 9:
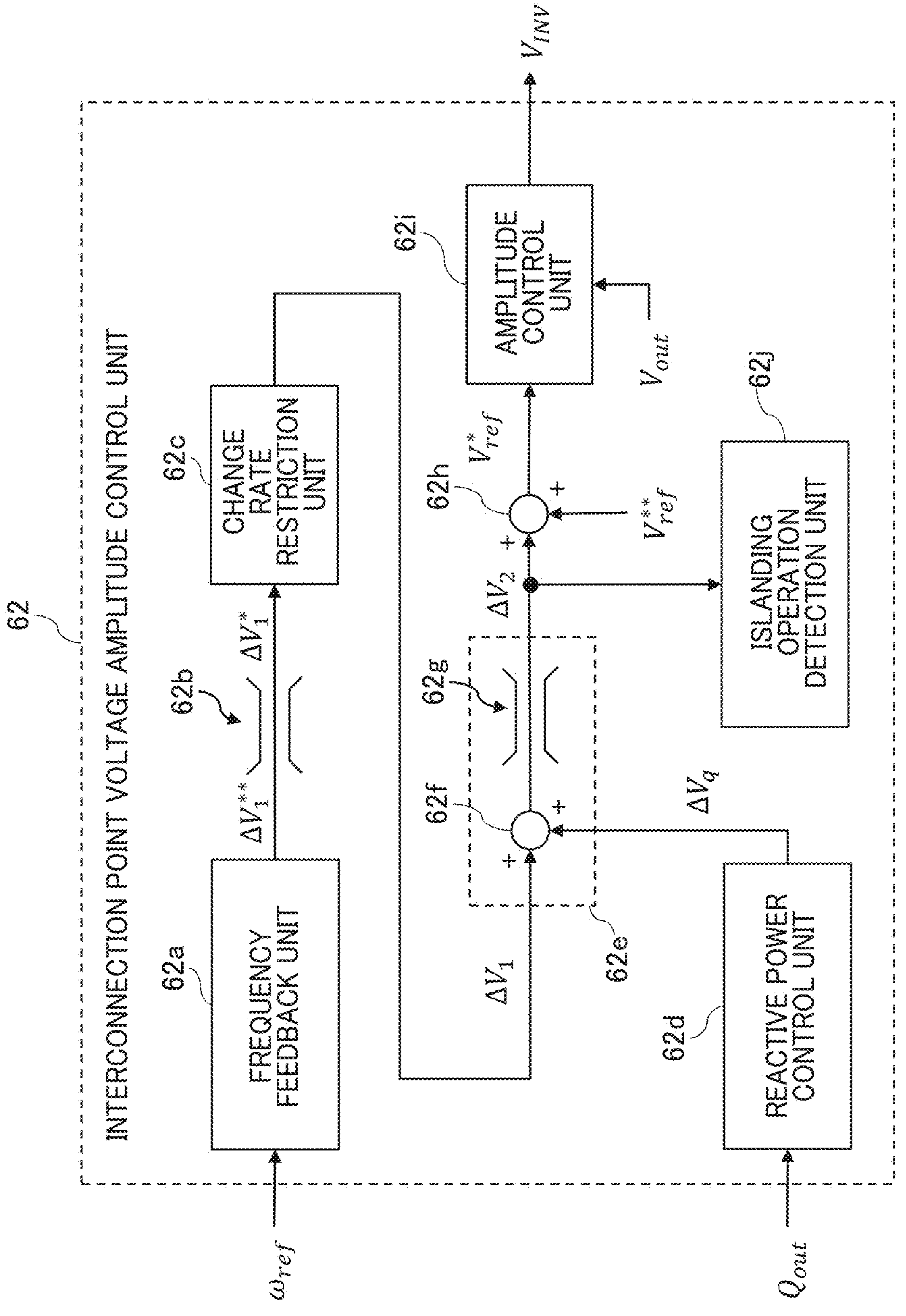
FIG. 9 is a diagram to describe an interconnection point voltage amplitude control unit 22 of the second embodiment.

FIG. 9 is a diagram to describe the interconnection point voltage amplitude unit control 62. The interconnection point voltage amplitude control unit 62 computes an inverter output voltage amplitude command value $V_{INV}$ for controlling an amplitude of the voltage output from the power conversion unit 30.

The interconnection point voltage amplitude control unit 62 includes a frequency feedback unit 62*a*, an upper and lower limit restriction unit 62*b*, a change rate restriction unit 62*c*, a reactive power control unit 62*d*, an output unit 62*e*, an adder 62*h*, an amplitude control unit 62*i*, and an islanding operation detection unit 62*j*.

Frequency Feedback Unit 62*a*

The frequency feedback unit 62*a* outputs a voltage $\Delta V_1^{**}$ depending on a frequency ω in the virtual synchronous generator function.

The frequency feedback unit 62*a* outputs, when the power converter 6 is in an islanding operation state, a voltage with an increased width of change due to lack of stability.

In the present embodiment, the frequency feedback unit 62*a* outputs the voltage $\Delta V_1^{**}$ (following equation) obtained by applying computation of a certain transfer function $G_O$ to the frequency ω.

$$\Delta V_1^{**} = G_O\omega \quad \text{[Math. 20]}$$

In the present embodiment, the following equation is used as a transfer function $G_O$.

$$G_O = -\frac{\gamma\tau s}{(1+\tau s)^2} \quad \text{[Math. 21]}$$

Here, s is a Laplace operator. The parameters γ and τ are parameters set beforehand by a designer, an operator, or the like of the power converter 6.

The parameters γ and τ of Equation 21 are determined such that stability is maintained in system interconnection and instability occurs in an islanding operation state.

Specifically, the parameters γ and τ are set based on a characteristic equation related to a closed-loop transfer function $G_C$ in a case where a change in a phase θ being an output of the virtual synchronous generator using active power as an input, a voltage amplitude change being a result obtained by performing computation of a certain transfer function $G_O$ using a frequency ω of the virtual synchronous generator or an interconnection point voltage frequency $\omega_{out}$ as an input, and an active power change caused by the phase change and the voltage amplitude change are collectively regarded as one closed-loop system.

The characteristic equation of the closed-loop transfer function $G_C$ differs between a case where the power converter 6 is interconnected and a case where the power converter 6 is in islanding operation. The characteristic equation in each case will be derived below. Note that, in the derivation of the characteristic equation, assume that the impedance X2 (FIGS. 6 and 7) is sufficiently small and can be ignored. Also, assume that a system frequency is equal to the nominal frequency.

First, consider a case where a frequency ω for the voltage output from the power converter 6 changes by Δω from a rated frequency $\omega_n$.

Accordingly, a change Δθ in a phase of the voltage output from the power converter 6 (equal to a change in a phase difference between the voltage and a voltage from the system) is expressed as the following equation.

$$\Delta\theta = \frac{\Delta\omega}{s} \quad \text{[Math. 22]}$$

Here, the denominator on the right-hand side is a Laplace operator s.

A change $\Delta P_1$ in active power $P_1$ flowing in the power system 1 caused by the change Δθ in the phase in Equation 22 is expressed as the following equation, if the phase difference is not large.

$$\Delta P_1 = \begin{cases} \frac{V_{out}V_0}{X1}\sin\Delta\theta \approx \frac{V_{out}V_0}{X1}\Delta\theta \\ 0 \end{cases} \quad \text{[Math. 23]}$$

Here, an upper part and a lower part of the right-hand side correspond to a case of interconnection and a case of an islanding operation state, respectively. In the islanding operation state, the active power $P_1$ flowing in the power system 1 is always 0, and thus the change $\Delta P_1$ is also 0. $V_0$ is an amplitude of a voltage output from the power system 1.

Furthermore, a change $\Delta P_2$ in power consumption $P_2$ in the load G caused by an interconnection point voltage change is expressed as the following equation.

$$\Delta P_2 = \Delta(GV_{out}^2) \approx 2GV_{out}\Delta V_{out} \quad \text{[Math. 24]}$$

Thus, when a change ($\Delta P=\Delta P_1+\Delta P_2$) in active power $P_{out}$ output from the power converter 2 occurs, a frequency change Δω of the following equation occurs in the virtual synchronous generator function.

$$\Delta\omega = -\frac{\omega_n}{Ms+D}\Delta P \quad \text{[Math. 25]}$$

Furthermore, when the change Δω in the frequency ω of Equation 25 occurs, a change ΔV in the amplitude $V_{out}$ of the voltage is expressed as the following equation by using Equation 21.

$$\Delta V = -\frac{\gamma\tau s}{(1+\tau s)^2}\Delta\omega \quad \text{[Math. 26]}$$

In consideration of Equations 22 to 26, the characteristic equation of the closed-loop transfer function $G_C$ in a closed loop in each of the interconnection and the islanding operation can be derived as follows.

A characteristic polynomial in the interconnection.

$$(Ms+D)s(1+\tau s)^2 + \omega_n\frac{V_{out}V_0}{X1}(1+\tau s)^2 - 2GV_{out}\omega_n\gamma\tau s^2 \quad \text{[Math. 27]}$$

A characteristic polynomial in the islanding operation.

$$(Ms+D)(1+\tau s)^2-2GV_{out}\omega_n\gamma\tau s \qquad \text{[Math. 28]}$$

A condition for the parameters γ and τ will be derived below by using Equations 27 and 28.

In the interconnection, the parameters are set such that stability is maintained even when the voltage amplitude is changed depending on frequency change.

Accordingly, Equation 27 is required to be a stable polynomial. This requires at least that signs of coefficients with respective orders of a Laplace operator in Equation 27 are all the same.

In Equation 27, the signs of the fourth, third, first, and zero-order coefficients of the Laplace operator s are all positive, but the sign of the second-order coefficient is indefinite.

Accordingly, the following condition is necessary for making the sign of the second-order coefficient of the Laplace operator s in Equation 27 positive.

$$\gamma<\frac{V_0\tau}{2GX1} \qquad \text{[Math. 29]}$$

Furthermore, in the islanding operation, the parameters are determined such that the system becomes unstable.

Accordingly, Equation 28 is required to be an unstable polynomial. This only requires that at least one of coefficients with respective orders of a Laplace operator s in Equation 28 has a sign different from a sign of another coefficient with an order.

In Equation 28, the signs of the third, second, and zero-order coefficients of the Laplace operator s are all positive, but the sign of the first-order coefficient is indefinite.

Accordingly, the following condition is given to make the sign of the first-order coefficient of the Laplace operator s in Equation 28 negative.

$$\gamma<\frac{M+2D\tau}{2GV_{out}\omega_n\tau} \qquad \text{[Math. 30]}$$

To summarize the description above, the parameters γ and τ satisfying the conditions for Equations 29 and 30 are set, thereby maintaining stability in interconnection and leading to instability in an islanding operation state, and thus it is possible to detect islanding operation.

Note that the processing executed by the frequency feedback unit 62*a* is not limited to this example. The processing executed by the frequency feedback unit 62*a* is preferably computation with which stability is maintained in system interconnection and instability occurs in an islanding operation state.

The frequency feedback unit 62*a* may use a frequency $\omega_{out}$ of a voltage at the interconnection point to the power system 1, in place of the frequency ω of the VSG.

Upper and Lower Limit Restriction Unit 62*b*

The upper and lower limit restriction unit 62*b* outputs a voltage obtained by applying an upper and lower limit restriction (corresponding to a "second upper and lower limit restriction") to the output of the frequency feedback unit 62*a*.

In other words, if an input from the frequency feedback unit 62*a* is a certain lower limit value or greater and is a certain upper limit value or less, the upper and lower limit restriction unit 62*b* directly outputs the input from the frequency feedback unit 62*a* as a voltage $\Delta V_1{**}$.

If the input from the frequency feedback unit 62*a* is greater than the certain upper limit value, the upper and lower limit restriction unit 62*b* outputs the upper limit value as $\Delta V_1{}$. If the input from the frequency feedback unit 62***a* is less than the certain lower limit value, the upper and lower limit restriction unit 62*b* outputs the lower limit value as $\Delta V_1{}$. Note that the upper and lower limit restriction unit 62***b* is an optional configuration, and may not necessarily be provided.

Change Rate Restriction Unit 62*c*

The change rate restriction unit 62*c* outputs a voltage obtained by applying, to the output of the upper and lower limit restriction unit 62*b*, an upper limit restriction of a time change rate.

In other words, if a value (time change rate) obtained by differentiating, by time, the voltage $\Delta V_1{}$ being an input from the upper and lower limit restriction unit 62***b* is a certain upper limit value or less, the change rate restriction unit 62*c* directly outputs the input from the upper and lower limit restriction unit 62*b* as a voltage $\Delta V_1{*}$.

If the value obtained by differentiating, by time, the voltage $\Delta V_1{}$ being an input from the upper and lower limit restriction unit 62***b* is greater than the certain upper limit value, the change rate restriction unit 62*c* outputs, as a voltage $\Delta V_1{*}$, a voltage modulated so that the value obtained by differentiating the voltage $\Delta V_1{}$ by time is the upper limit value. Note that the change rate restriction unit 62***c* is an optional configuration, and may not necessarily be provided.

Reactive Power Control Unit 62*d*

The reactive power control unit 62*d* outputs a voltage $\Delta V_q$ (corresponding to a "first voltage") depending on reactive power $Q_{out}$ at an interconnection point P.

Specifically, when the power converter 6 is interconnected with the power system 1, the reactive power control unit 62*d* outputs the voltage $\Delta V_q$ for suppressing change in the reactive power $Q_{out}$ at the interconnection point P.

When the power converter 6 is interconnected with the power system 1, the reactive power $Q_{out}$ also changes with change in the interconnection point voltage. Thus, $\Delta V_q$ is output so as to cancel the frequency feedback output, thereby suppressing change in the interconnection point voltage.

On the other hand, when the power converter 6 is in an islanding operation state, the reactive power is independent of the interconnection point voltage. Thus, the frequency feedback output cannot be canceled, and the interconnection point voltage changes in conjunction with the frequency feedback output.

The islanding operation detection unit 62*j* described below utilizes this to detect, when the power converter 6 has actually transitioned to an islanding operation state, the state.

Output Unit 62*e*

The output unit 62*e* outputs a voltage $\Delta V_2$ (corresponding to a "third voltage") obtained by applying an upper and lower limit restriction (corresponding to a "first upper and lower limit restriction") to a result of addition of a voltage $\Delta V_1$ (corresponding to a "second voltage") based on the output of the frequency feedback unit 62*a* to the voltage $\Delta V_q$ ($\Delta V_1+\Delta V_q$).

In the present embodiment, the "voltage $\Delta V_1$ based on the output of the frequency feedback unit 62*a*" is an output of the change rate restriction unit 62*c*.

Note that, as described above, the change rate restriction unit 62*c* is an optional configuration. When the interconnection point voltage amplitude control unit 62 includes the upper and lower limit restriction unit 62*b* and does not include the change rate restriction unit 62*c*, the voltage $\Delta V_1$ is preferably a voltage based on the output of the upper and lower limit restriction unit 62*b*.

When the interconnection point voltage amplitude control unit 62 includes both of the upper and lower limit restriction unit 62*b* and the change rate restriction unit 62*c*, the voltage $\Delta V_1$ is preferably a voltage based on the output of the change rate restriction unit 62*c*.

The output unit 62*e* includes an adder 62*f* and a restriction unit 62*g*. The adder 62*f* outputs a result of addition of the voltage $\Delta V_1$ to the voltage $\Delta V_q$ ($\Delta V_1+\Delta V_q$).

The restriction unit 62*g* outputs a voltage $\Delta V_2$ obtained by applying an upper and lower limit restriction to the input ($\Delta V_1+\Delta V_q$) from the adder 62*f*.

Adder 62*h*

The adder 62*h* (corresponding to a "first addition unit") outputs an amplitude command value $V_{ref}$* (corresponding to a "second amplitude command value") obtained by adding a certain amplitude command value $V_{ref}$** (corresponding to a "first amplitude command value") related to a voltage $V_{out}$ at the interconnection point P to the voltage $\Delta V_2$.

Amplitude Control Unit 62*i*

The amplitude control unit 62*i* generates an inverter output voltage amplitude command value $V_{INV}$, based on the amplitude command value $V_{ref}$* and a voltage amplitude $V_{out}$ at the interconnection point.

In this case, the amplitude control unit 62*i* generates the inverter voltage amplitude command value $V_{INV}$ such that a measured value $V_{out}$ of the voltage amplitude at the point of the installation of the measurement unit 4*b* matches the amplitude command value $V_{ref}$*.

Islanding Operation Detection Unit 62*j*

The islanding operation detection unit 62*j* determines whether the power converter 6 is in an islanding operation state, and outputs, when judging that the power converter 6 is in the islanding operation state, the determination as a detection result.

Specifically, when the voltage $\Delta V_2$ reaches the upper and lower limit restriction in the restriction unit 62*g*, the islanding operation detection unit 62*j* detects an islanding operation state in which the power converter 6 is separated from the power system 1.

In the present embodiment, the islanding operation detection unit 62*j* outputs "0" when not detecting an islanding operation state and outputs "1" when detecting the state.

Validity of detection based on such processing by the islanding operation detection unit 62*j* will be described by using results of numerical simulation described below.

Note that, in the interconnection point voltage amplitude control unit 62 of the present embodiment described above, the input to the frequency feedback unit 62*a* is the VSG frequency ω, but is not limited to this. As the input to the frequency feedback unit 62*a*, the frequency $\omega_{out}$ of the voltage $V_{out}$ measured by the measurement unit 4*b* may be used.

{Instantaneous Voltage Command Generation Unit 23}

Referring back to FIG. 7, the instantaneous voltage command generation unit 23 generates an instantaneous voltage command value $V_{INV}$ for each of three phases for the voltage output from the power converter 6.

Note that the PWM pulse generation unit 24 and the power conversion unit 30 are the same as those of the power converter 2 of the first embodiment.

Also, in the present embodiment, a combination of the PWM pulse generation unit 24 and the power conversion unit 30 corresponds to a "voltage output unit." In other words, the voltage output unit generates a three-phase AC voltage, based on a phase and an inverter output voltage amplitude command value in the virtual synchronous generator function.

The "phase in the virtual synchronous generator function" is a command value 0 of the phase in FIG. 8, and the "inverter output voltage amplitude command value in the virtual synchronous generator function" is the voltage amplitude command value $V_{INV}$ in FIG. 9.

<<Result of Numerical Simulation>>

Figure 10A:
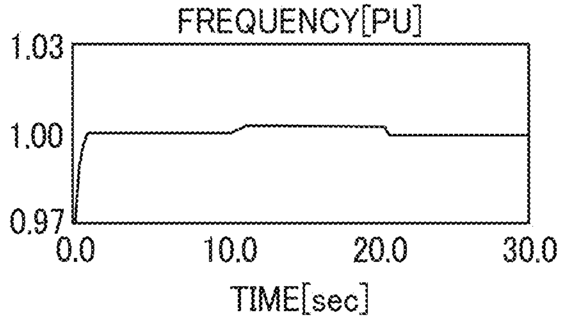
FIGS. 10A to 10C are diagrams to show a result of numerical simulation.
Figure 10B:
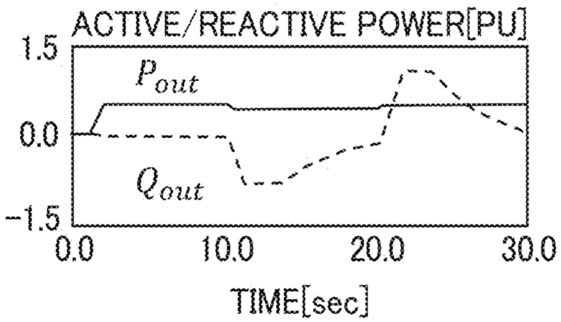
Figure 10C:
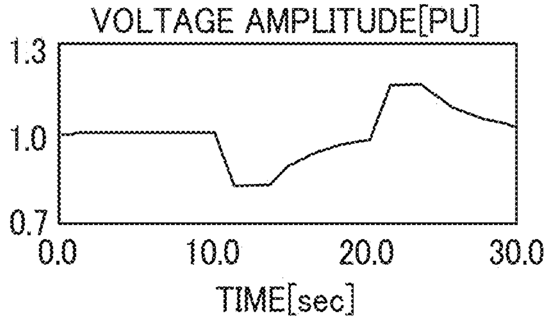
Figure 11A:
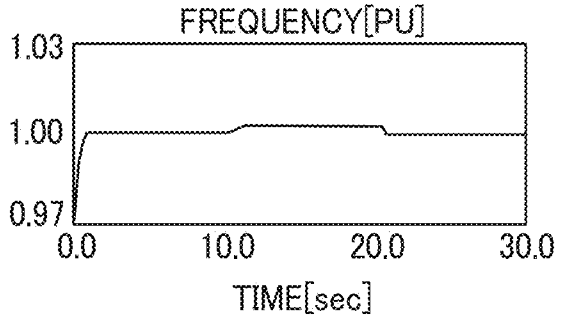
FIGS. 11A to 11D are diagrams to show a result of numerical simulation.
Figure 11B:
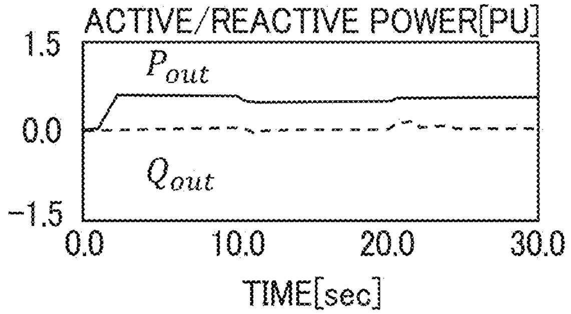
Figure 11C:
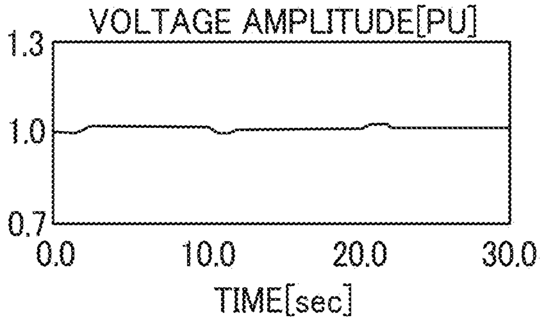
Figure 11D:
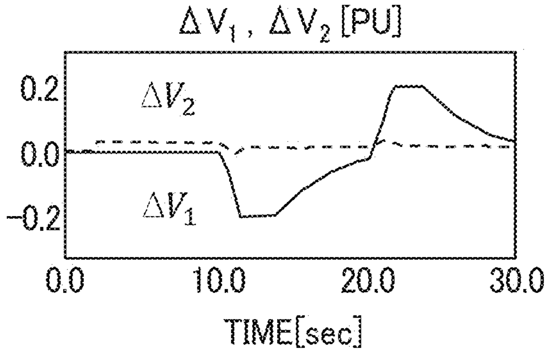
Figure 12A:
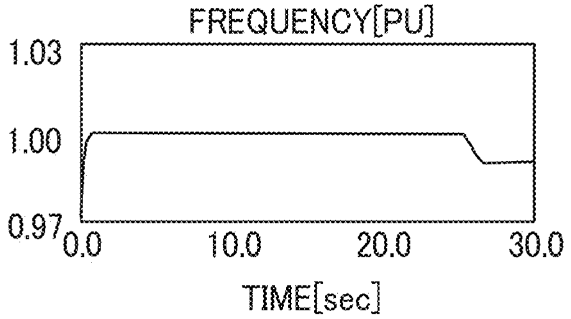
FIGS. 12A to 12D are diagrams to show a result of numerical simulation.
Figure 12B:
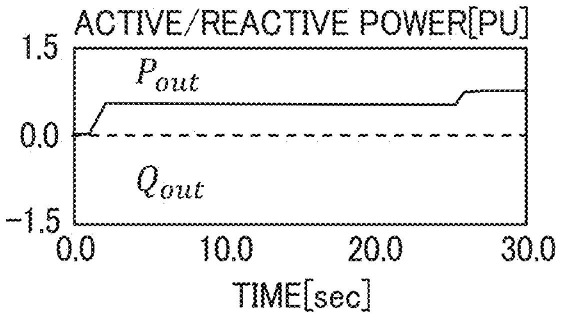
Figure 12C:
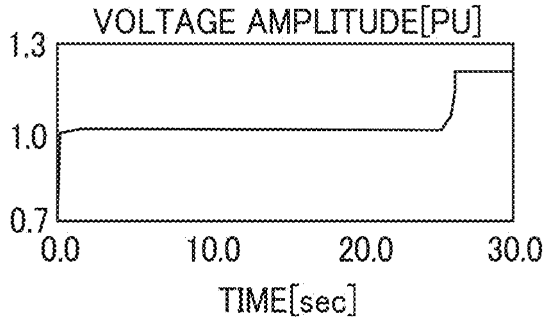
Figure 12D:
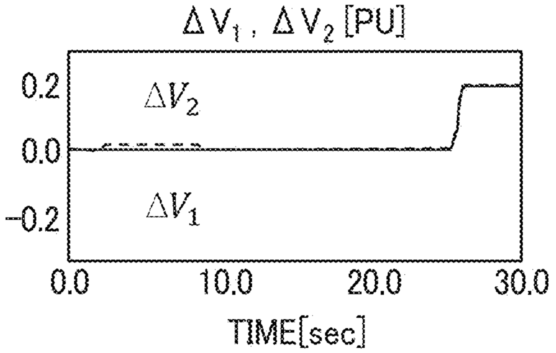

FIG. 10 is a result of numerical simulation assuming a conventional power converter. In other words, this case does not include the reactive power control unit 62*d* of FIG. 9 in the power converter 6 of the present embodiment, and corresponds to a case where the voltage $\Delta V_1$ is directly input to the output unit 62*e*.

FIGS. 11 and 12 are diagrams to show the results of the numerical simulation assuming the power converter 6 of the present embodiment.

Here, FIGS. 10 and 11 are numerical simulation results in a case assuming that a power converter is interconnected with the power system 1 without transitioning to an islanding operation state and that a frequency changes. FIG. 12 is a numerical simulation result in a case assuming that the power converter has transitioned to an islanding operation state.

In FIGS. 10, 11, and 12, (a), (b), (c), and (d) indicate transition of a frequency of the power system 1, transition of active power $P_{out}$ and reactive power $Q_{out}$, transition of a voltage amplitude $V_{out}$, and transition of a value [PU] obtained by unitizing voltages $\Delta V_1$ and $\Delta V_2$, respectively ((d) is only for FIGS. 11 and 12). The horizontal axis corresponds to a time point [sec].

These numerical simulations assume that the inertia constant M is 5, the braking constant D is 25, and the parameters γ and τ of the transfer function $D_O$ (Equation 21) are 2.0 and 1.0, respectively. Note that these are common to the numerical simulations described in the present description.

First, the result shown in FIG. 10 will be described. FIG. 10 assumes a power converter that changes a voltage amplitude by performing frequency feedback as an islanding operation detection means without performing reactive power feedback, and is a numerical simulation result in a case assuming that the power converter is interconnected with the power system 1 and that a frequency changes.

FIG. 10(*a*) shows transition of the frequency of the power system 1 assumed in this numerical simulation. As described above, FIG. 10(*a*) assumes a case where a system frequency increases by 0.2% at time points 10 [sec] to 20 [sec].

FIG. 10(*b*) shows transition of the active power $P_{out}$ (solid line) and the reactive power $Q_{out}$ (broken line). In FIG. 10(*b*), in particular, the transition of the reactive power Cout transitions at almost 0 (zero) until the time point 10 [sec] at which frequency change is assumed to start, but starts to drop at the time point 10 [sec].

The transition of the reactive power $Q_{out}$ is saturated for about 2.0 [sec] from around a time point 11.5 [sec], and then rises toward 0 (zero).

Thereafter, the transition of the reactive power $Q_{out}$ starts to rise at a time point 20 [sec] at which the frequency change is assumed to end, and then is saturated for about 2.0 [sec], and then drops toward 0 (zero).

FIG. 10(*c*) shows transition of the voltage amplitude $V_{out}$. The transition of the voltage amplitude $V_{out}$ is similar to that of the reactive power Cout shown in FIG. 10(*b*).

As can be seen from the result shown in FIG. 10, in the conventional power converter, occurrence of change in the system frequency causes large change in a voltage amplitude, resulting in erroneous detection of islanding operation.

Next, the result shown in FIG. 11 will be described. FIG. 11 assumes the power converter 6 of the present embodiment, and is a numerical simulation result in a case assuming that the power converter is interconnected with the power system 1 and that a frequency changes.

FIG. 11(*a*) is the same as FIG. 10(*a*), and shows transition of the frequency of the power system 1 assumed in this numerical simulation. In other words, FIG. 11(*a*) assumes a case where the frequency of the power system increases by 0.2% at time points 10 [sec] to 20 [sec].

FIG. 11(*b*) shows transition of active power $P_{out}$ (solid line) and reactive power $Q_{out}$ (broken line). In FIG. 11(*b*), in particular, the transition of the reactive power $Q_{out}$ is substantially constant over time points 0 [sec] to 30 [sec].

This is accompanied by the case that the reactive power control unit 62*d* of FIG. 9 outputs, to the adder 62*f*, the voltage $\Delta V_q$ for suppressing change in the reactive power $Q_{out}$.

FIG. 11(*c*) shows transition of the voltage amplitude $V_{out}$. The transition of the voltage amplitude $V_{out}$ is similar to that of the reactive power Cout shown in FIG. 11(*b*), and is substantially constant.

FIG. 11(*d*) shows transition of the voltage $\Delta V_1$ (solid line) and the voltage $\Delta V_2$ (broken line) in FIG. 9. In FIG. 11(*d*), in particular, the voltage $\Delta V_2$ transitions substantially constantly.

This numerical simulation assumes that the upper limit value and the lower limit value in the restriction unit 62*g* of FIG. 9 are 0.2 [PU] and −0.2 [PU], respectively. In other words, in FIG. 11(*d*), the voltage $\Delta V_2$ transitions within a range of the upper and lower limits. In such a case, the islanding operation detection unit 22*j* does not determine that the power converter 6 has transitioned to an islanding operation state.

Therefore, according to the power converter 6 of the present embodiment, even if a system frequency changes for some reason when the power converter 6 is interconnected with the power system 1, it is possible to avoid detecting that the power converter 6 has transitioned to an islanding operation state.

Next, the result shown in FIG. 12 will be described. FIG. 12 assumes the power converter 6 of the present embodiment, and is a numerical simulation result in a case assuming that the power converter is interconnected with the power system 1 and has transitioned to an islanding operation state.

This example assumes that the power converter 2 is interconnected with the power system 1 until a time point 25 [sec] and that the power converter 2 transitions to an islanding operation state at the time point 25 [sec].

FIG. 12(*a*) shows transition of the frequency of the power system 1. FIG. 12(*b*) shows transition of the active power $P_{out}$ (solid line) and the reactive power $Q_{out}$ (broken line). In FIG. 12(*b*), in particular, the transition of the reactive power $Q_{out}$ is constant at 0 (zero) over time points 0 [sec] to 30 [sec].

FIG. 12(*c*) shows transition of the voltage amplitude $V_{out}$. The transition of the voltage amplitude $V_{out}$ starts to rise at the time point 25 [sec] at which the power converter 6 transitions to the islanding operation state. The transition of the voltage amplitude $V_{out}$ is saturated at 1.2 [PU].

FIG. 12(*d*) shows transition of the voltage $\Delta V_1$ (solid line) and the voltage $\Delta V_2$ (broken line) in FIG. 9. The voltage $\Delta V_1$ and the voltage $\Delta V_2$ transition in the same manner. These transitions are saturated at 0.2 [PU].

As described above, this numerical simulation assumes that the upper limit value in the restriction unit 62*g* of FIG. 9 is 0.2 [PU]. In other words, in FIG. 12(*d*), the voltage $\Delta V_2$ reaches the upper limit. In such a case, the islanding operation detection unit 62*j* determines that the power converter 6 has transitioned to an islanding operation state.

Therefore, according to the power converter 6 of the present embodiment, it is possible to detect, when the power converter 6 has actually transitioned to an islanding operation state, the state while avoiding erroneous detection of islanding operation when a system frequency changes in interconnection.

{Variation 2}

Figure 13:
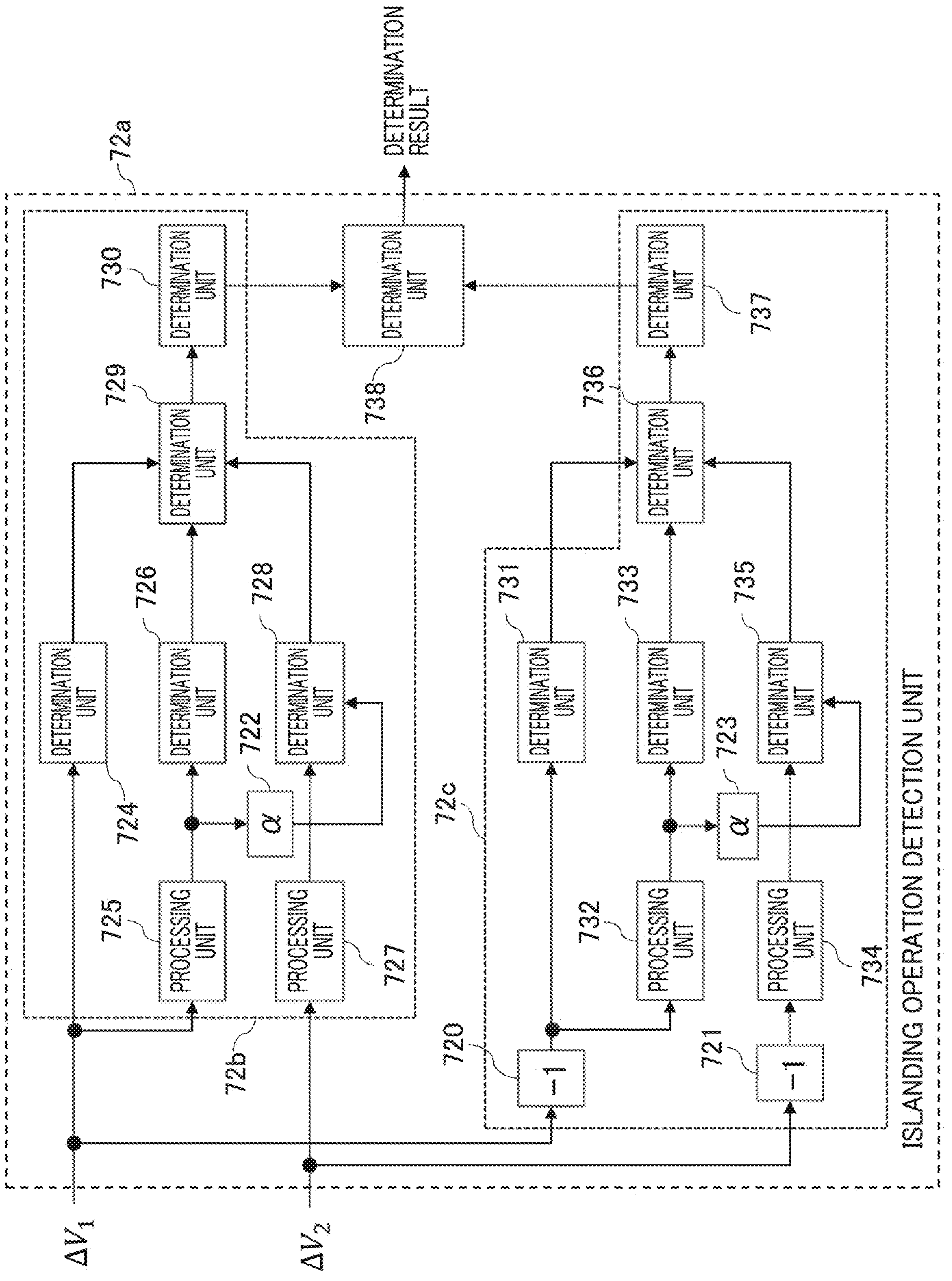
FIG. 13 is a diagram to describe processing executed by an islanding operation detection unit of Variation 2.
Figure 14A:
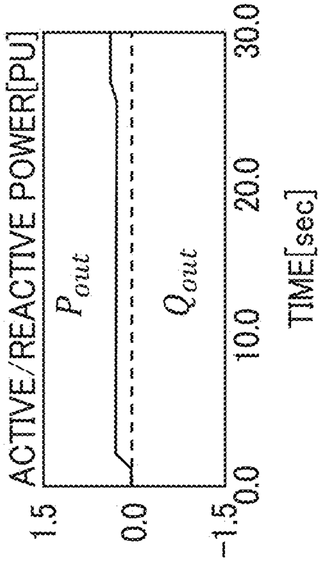
FIGS. 14A to 14E are diagrams to show results of numerical simulation.
Figure 14B:
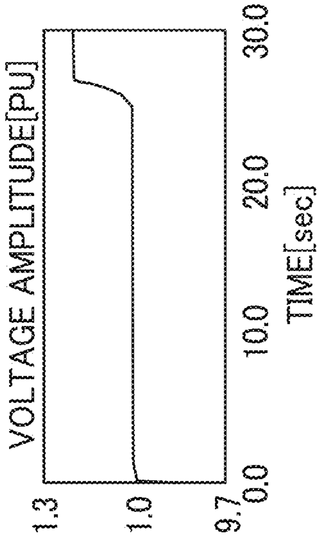
Figure 14C:
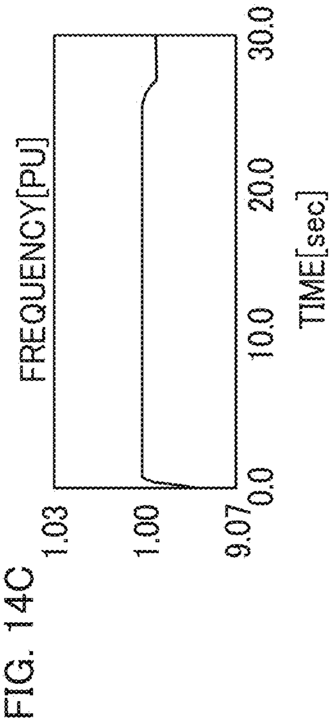
Figure 14D:
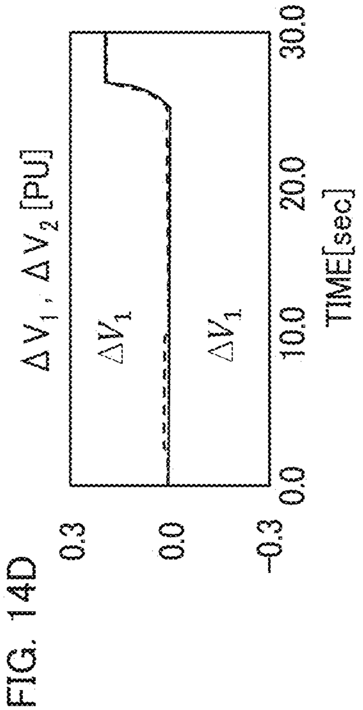
Figure 14E:
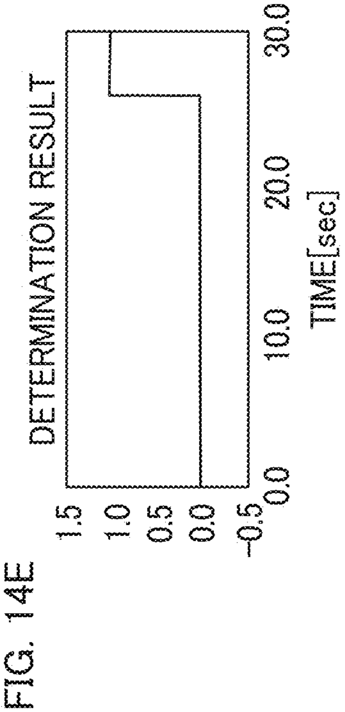
Figure 15A:
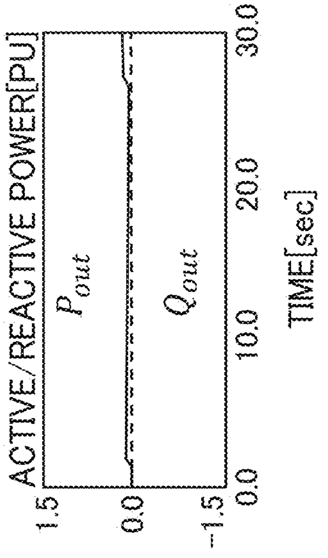
FIGS. 15A to 15E are diagrams to show results of numerical simulation.
Figure 15B:
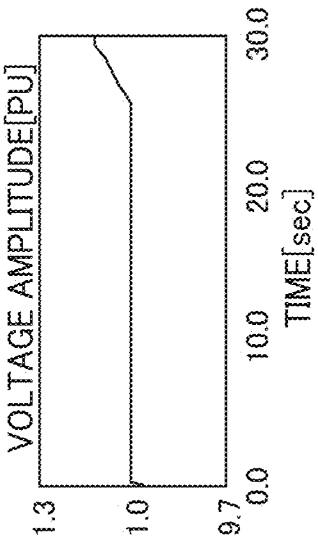
Figure 15C:
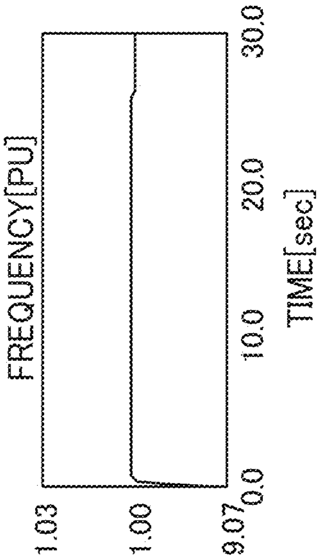
Figure 15D:
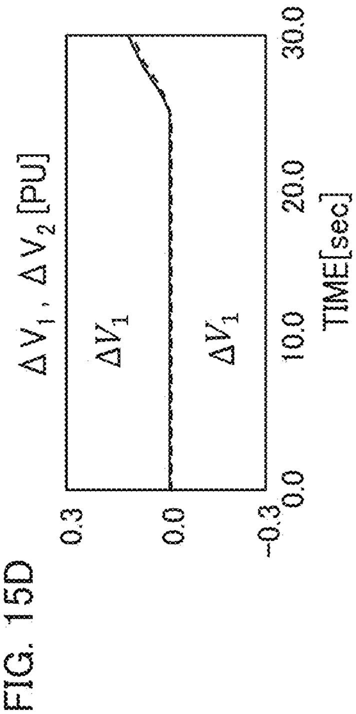
Figure 15E:
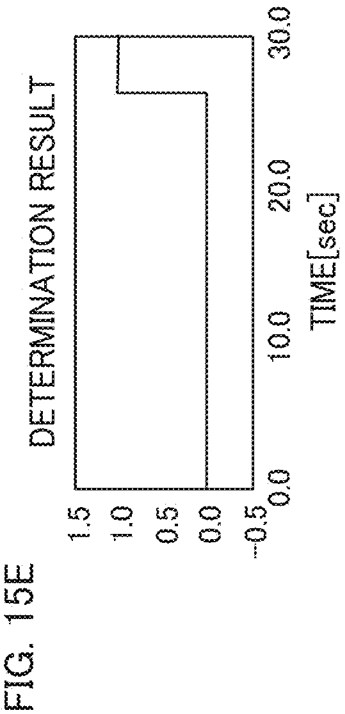

A power converter 7 according to the present variation differs from the second embodiment in the processing executed by the islanding operation detection unit 62*j* of FIG. 9. FIG. 13 is a diagram to describe processing executed by an islanding operation detection unit 72*a* in the present variation.

The smaller power consumed by the load G (FIG. 6) is, the smaller a width of change in the voltage $\Delta V_1$ (FIG. 7) is. In such a case, in the processing executed by the islanding operation detection unit 62*j* of the second embodiment, there is a case where even when the power converter 7 is actually in an islanding operation state, the voltage $\Delta V_2$ does not reach the upper and lower limit restriction in the restriction unit 62*g*, as change in the voltage $\Delta V_2$ is insufficient.

Thus, the load being small makes a voltage and a frequency less divergent even in transition to an islanding operation state, and makes it difficult to detect islanding operation. According to the islanding operation detection unit 72*a* in the present variation, it is possible to detect an islanding operation state even in such a case.

The islanding operation detection unit 72*a* in the present variation detects that the power converter 7 is in an islanding operation state, based on the voltage $\Delta V_1$ and the voltage $\Delta V_2$.

Specifically, the islanding operation detection unit 72*a* in the present variation detects that the power converter 7 is in an islanding operation state, based on transition of the voltage $\Delta V_1$ and transition of a ratio between the voltage $\Delta V_1$ and the voltage $\Delta V_2$.

The islanding operation detection unit 72*a* in the present variation includes a first block 72*b*, a second block 72*c*, and a determination unit 738.

The first block 72*b* is a block that determines whether there is a possibility that the power converter 7 has transitioned to an islanding operation state when both of the voltage $\Delta V_1$ and the voltage $\Delta V_2$ change in a positive direction. The first block 72*b* includes a multiplication unit 722, processing units 725 and 727, and determination units 724, 726, 728, 729, and 739.

The determination unit 724 determines whether the voltage $\Delta V_1$ has exceeded a certain upper limit value Vth, and outputs the determination result to the determination unit 729. Here, as the upper limit value $V_{th}$, a value being a positive value is set, the value being smaller than the upper limit value in the restriction unit 62*g* of FIG. 9.

Note that whether the voltage $\Delta V_1$ has exceeded the upper limit value $V_{th}$ is referred to as "Condition 1." A case that the voltage $\Delta V_1$ has exceeded the upper limit value $V_{th}$ is referred to as "Condition 1 has been satisfied."

Here, a case that Condition 1 has been satisfied means that the voltage $\Delta V_1$ starts rising. There is a possibility that the power converter 7 has transitioned to islanding operation when the voltage $\Delta V_1$ starts to rise, but there is a case where the voltage $\Delta V_1$ does not reach the upper limit value in the restriction unit 62*g*, depending on such a state of the load G as that described above.

The processing unit 725 outputs a time change rate of the voltage $\Delta V_1$ (that is, a value of a first-order differential of the voltage $\Delta V_1$ with respect to time t ($d\Delta V_1/dt$)).

In a case where the time change rate of the voltage $\Delta V_1$ ($d\Delta V_1/dt$) being an input from the processing unit 725 is greater than 0, the determination unit 726 outputs, to the determination unit 729, a determination result indicating the case.

Note that whether the time change rate of the voltage $\Delta V_1$ ($d\Delta V_1/dt$) is greater than 0 is referred to as "Condition 2." The time change rate of the voltage $\Delta V_1$ ($d\Delta V_1/dt$) being greater than 0 is referred to as "Condition 2 has been satisfied."

Here, a case that Condition 2 has been satisfied means that the voltage $\Delta V_1$ is rising monotonously. There is a possibility that the power converter 7 has transitioned to islanding operation when the voltage $\Delta V_1$ is rising monotonously, but there is a case where the voltage $\Delta V_1$ does not reach the upper limit value in the restriction unit 72*g*, depending on such a state of the load G as that described above.

The processing unit 727 outputs a value of a first-order differential of the voltage $\Delta V_2$ with respect to time t ($d\Delta V_2/dt$).

The multiplication unit 722 outputs a value ($\alpha d\Delta V_1/dt$) obtained by multiplying the output ($d\Delta V_1/dt$) of the processing unit 725 by a constant $\alpha$. Here, the constant $\alpha$ is a positive value less than 1.0.

The determination unit 728 compares the output ($d\Delta V_2/dt$) of the processing unit 727 with the output ($\alpha d\Delta V_1/dt$) of the multiplication unit 722, and outputs, in a case where the output of the multiplication unit 722 is greater, the case to the determination unit 729.

Note that whether the output of the multiplication unit 722 is greater than the output of the processing unit 727 is referred to as "condition 3." A case that the output of the multiplication unit 722 being greater than the output of the processing unit 727 is referred to as "Condition 3 has been satisfied."

Here, a case that Condition 3 has been satisfied means that the time change rates of the voltage $\Delta V_1$ and the voltage $\Delta V_2$ indicate transitions similar to each other. In such a case, there is a possibility that the voltage $V_q$ in FIG. 7 is low and that the power converter 7 has transitioned to islanding operation.

The determination unit 729 determines whether there is a possibility that the power converter 7 has transitioned to an islanding operation state, based on respective inputs from the determination units 724, 726, and 728.

Specifically, when all of Conditions 1 to 3 described above are satisfied, the determination unit 729 determines that there is a possibility that the power converter 7 has transitioned to an islanding operation state.

The determination unit 730 further determines whether there is a possibility that the power converter 7 has transitioned to an islanding operation state, based on an input from the determination unit 729.

Specifically, when the unit determination 729 continues judging, over a certain period, that there is a possibility that the power converter 7 has transitioned to an islanding operation state, the determination unit 730 determines that there is a possibility that the power converter 7 has transitioned to the islanding operation state.

With the processing described above, the first block 72*b* determines whether there is a possibility that the power converter 7 has transitioned to an islanding operation state when both of the voltage $\Delta V_1$ and the voltage $\Delta V_2$ change in a positive direction.

The second block 72*c* determines whether there is a possibility that the power converter 7 has transitioned to an islanding operation state when both of the voltage $\Delta V_1$ and the voltage $\Delta V_2$ change in a negative direction.

The second block 72*c* differs from the first block 72*b* in that the second block 72*c* further includes multiplication units 720 and 721.

The multiplication unit 720 multiplies the voltage $\Delta V_1$ by −1, and the multiplication unit 720 multiplies the voltage $\Delta V_2$ by −1, thereby inverting signs of the voltage $\Delta V_1$ and the voltage $\Delta V_2$.

After inverting the signs, the second block 72*c* executes the same processing as that of the first block 72*b*. Therefore, detailed description of the second block 72*c* is omitted.

Note that the multiplication unit 723 and the determination units 731, 733, 735, 736, and 737 of the second block 72*c* execute the same processing as that of the multiplication unit 722 and the determination units 724, 726, 728, 729, and 739 of the first block 72*b*, respectively.

The determination unit 738 determines whether the power converter 7 has transitioned to an islanding operation state, based on inputs from the determination unit 730 and the determination unit 737.

Specifically, when both of the determination units 730 and 737 determine that there is a possibility that the power converter 7 has transitioned to an islanding operation state, the determination unit 738 determines that the power converter 7 has transitioned to the islanding operation state.

In the present variation, the islanding operation detection unit outputs "1" when judging that the power converter is in an islanding operation state, otherwise the islanding operation detection unit outputs "0."

<<Numerical Simulation Result>>

FIGS. 14 and 15 assumes the power converter 5 of the present variation, and are numerical simulation results in a case assuming that the power converter has transitioned to an islanding operation state. The load G is assumed to be 0.25 [PU] in FIG. 9, and is assumed to be 0.1 [PU] in FIG. 15.

First, the result shown in FIG. 14 in a case where the load G is large (0.25 [PU]) will be described. In FIG. 14, (a), (b), (c), (d), and (e) correspond to the active power and reactive power, the voltage, the frequency, the voltage $\Delta V_1$ and voltage $\Delta V_2$, and a result of the determination by the determination unit 738, respectively. Note that the same also applies to FIG. 15 described below.

In each of these diagrams, the horizontal axis corresponds to a time point [sec] and shows 0 [sec] to 30 [sec]. Each of these diagrams assume that the power converter is interconnected with the power system 1 at 0 [sec] to 25 [sec] and that the power converter transitions to an islanding operation state at 25 [sec].

Here, focusing particularly on the voltage $\Delta V_2$ in FIG. 14(*d*), the voltage $\Delta V_2$ starts to rise at a time point 25 [sec] at which the power converter transitions to the islanding operation state, and is saturated at 0.2 [PU] assumed to be the upper limit in the restriction unit 62*g* (FIG. 7).

Accordingly, the determination result in FIG. 14(*f*) shows switching from 0 to 1 around a time point 26 [sec], which shows the transition to the islanding operation state.

Next, the result shown in FIG. 10 in a case where the load G is small (0.1 [PU]) will be described.

Focusing particularly on the voltage $\Delta V_2$ in FIG. 15(*d*), the voltage $\Delta V_2$ starts to rise at a time point 25 [sec] at which the power converter transitions to the islanding operation state, but does not reach 0.2 [PU] assumed to be the upper limit in the restriction unit 62*g* of FIG. 7. Note that, in such a case, the power converter 6 of the second embodiment fails to determine transition to an islanding operation state.

However, after the transition to the islanding operation state, both of the voltage $\Delta V_1$ and the voltage $\Delta V_2$ start to rise in a positive direction and transition in the same manner. This means that the voltage $V_q$ in FIG. 7 is low.

The determination result in FIG. 15(*f*) shows switching from 0 to 1 around a time point 26 [sec], which shows the transition to the islanding operation state.

In other words, according to the power converter 7 of the present variation, it is possible to accurately perform the determination even when a width of change in the voltage $\Delta V_2$ does not reach the upper limit value in the restriction unit 62*g* of FIG. 7 in a short time because of small power consumed by the load. In other words, when the power converter 7 has transitioned to an islanding operation state, the transition to the islanding operation state being missed is suppressed.

{Variation 3}

Figure 16:
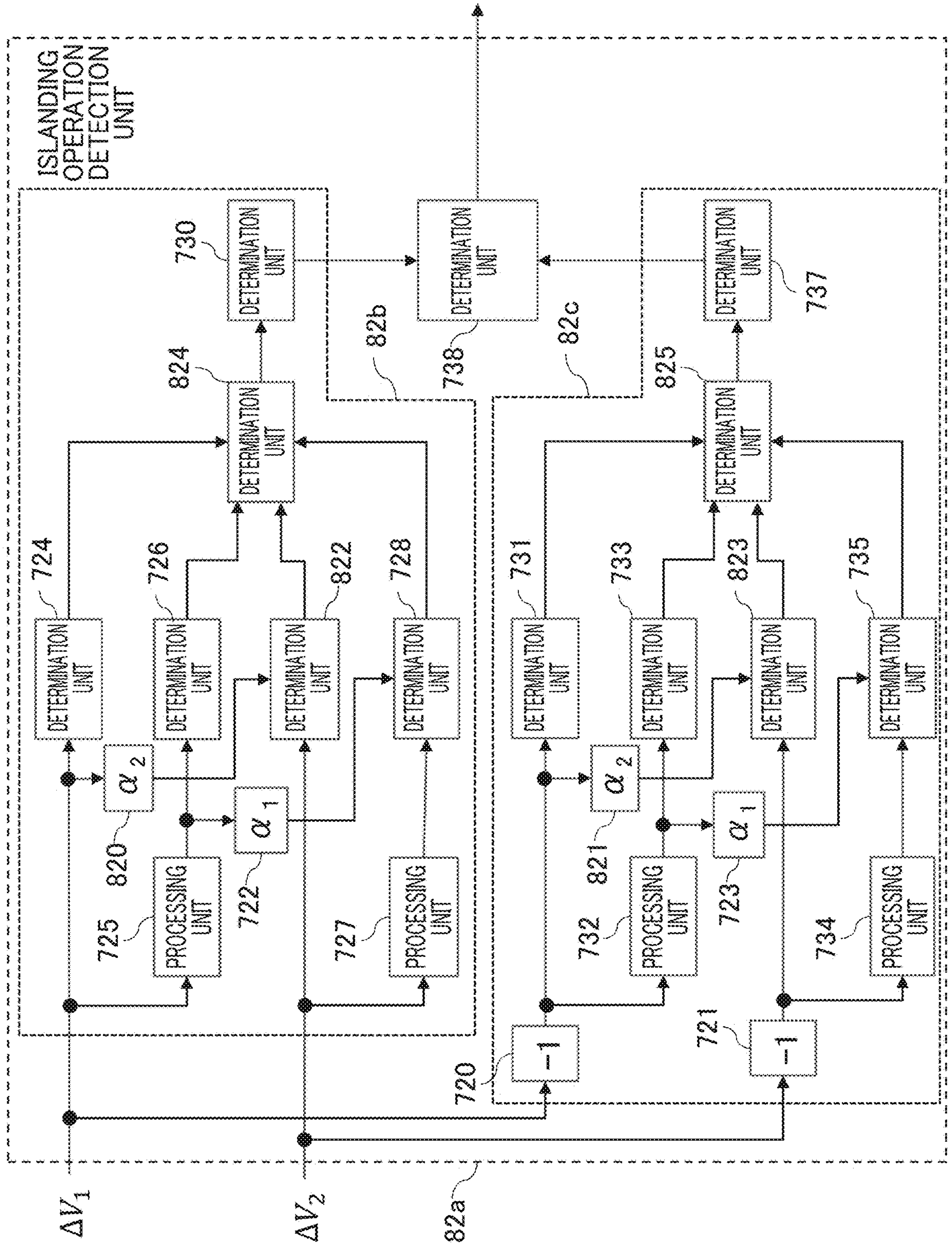
FIG. 16 is a diagram to describe processing executed by an islanding operation detection unit of Variation 3.

A power converter 8 according to the present variation differs from the second embodiment in the processing executed by the islanding operation detection unit 62*j* of FIG. 9. FIG. 16 is a diagram to describe processing executed by an islanding operation detection unit 82*a* in the present variation.

In the present variation, the islanding operation detection unit 82*a* detects that the power converter 8 is in an islanding operation state, based on transition of the voltage $\Delta V_1$ and a degree of similarity between the transition of the voltage $\Delta V_1$ and transition of the voltage $\Delta V_2$.

The islanding operation detection unit 82*a* of the present variation differs from the islanding operation detection unit 72*a* of Variation 1 in that the islanding operation detection unit 82*a* further includes multiplication units 820 and 821 and determination units 822 and 823.

Furthermore, the islanding operation detection unit 82*a* of the present variation includes determination units 824 and 825 in place of the determination units 729 and 736 of Variation 2. The following description will focus on differences between Variation 2 and the present variation, and description of shared portions will be omitted.

First, the first block 82*b* further includes the multiplication unit 820 and the determination unit 822, as compared with the first block 72*b* of Variation 2.

The multiplication unit 820 outputs a value ($\alpha_2\Delta V_1$) obtained by multiplying the voltage $\Delta V_1$ by a constant $\alpha_2$. Here, the constant $\alpha_2$ is a positive value less than 1.0.

The determination unit 822 compares the input ($\alpha_2\Delta V_1$) from the multiplication unit 820 with the voltage $\Delta V_2$, and outputs, in a case where the output of the multiplication unit 722 is greater, the case to the determination unit 824.

Note that whether the voltage $\Delta V_2$ is greater than the output of the multiplication unit 820 is referred to as "Condition 4." A case that the voltage $\Delta V_2$ is greater than the output of the multiplication unit 820 is referred to as "Condition 4 has been satisfied."

Here, when Condition 4 has been satisfied, there is an increased possibility that the voltage $V_q$ in FIG. 7 is low and that the power converter 8 has transitioned to islanding operation.

Note that, here, the ratio between the voltage $\Delta V_1$ and the voltage $\Delta V_2$ is an example of the "degree of the similarity" described above. The ratio between the voltage $\Delta V_1$ and the voltage $\Delta V_2$ means that the closer to 0 the ratio is, the lower the degree of the similarity is, and that the closer to 1 the ratio is, the higher the degree of the similarity is.

The determination unit 824 determines whether there is a possibility that the power converter 8 has transitioned to an islanding operation state, based on respective inputs from the determination units 724, 726, 728, and 822.

Specifically, when all of Conditions 1 to 4 described above are satisfied, the determination unit 824 determines that there is a possibility that the power converter 8 has transitioned to an islanding operation state.

With the processing described above, the first block 82*b* determines whether there is a possibility that the power converter 8 has transitioned to an islanding operation state when both of the voltage $\Delta V_1$ and the voltage $\Delta V_2$ change in a positive direction.

The second block 82*c* determines whether there is a possibility that the power converter 8 has transitioned to an islanding operation state when both of the voltage $\Delta V_1$ and the voltage $\Delta V_2$ change in a negative direction.

The multiplication unit 821 and the determination units 823 and 825 of the second block 82*c* execute the same processing as that of the multiplication unit 829 and the determination units 822 and 825 of the first block 82*b*, respectively, although description thereof is omitted.

Third Embodiment

Figure 17:
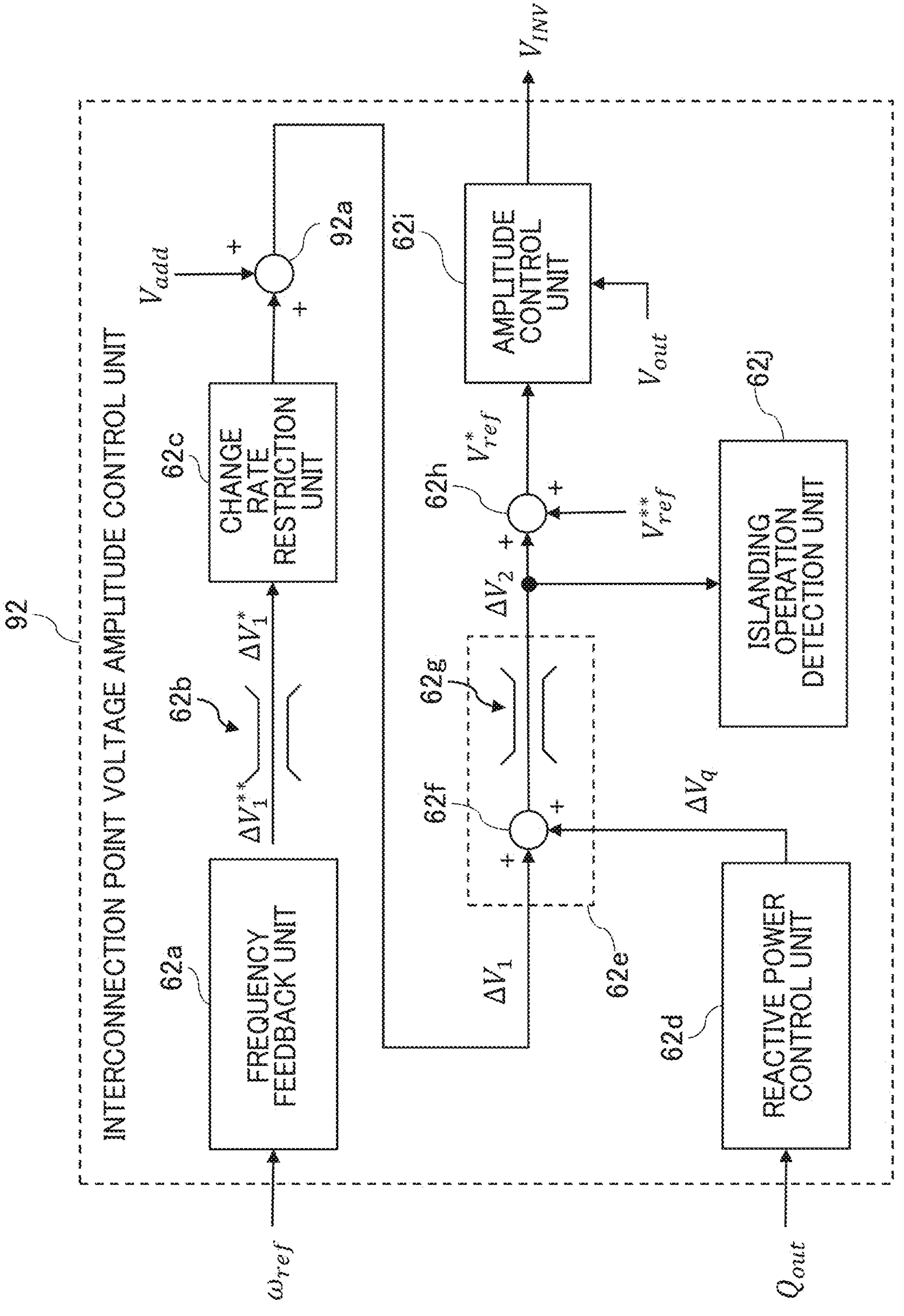
FIG. 17 is a diagram to describe an inverter output voltage phase generation unit 91 of a third embodiment.
Figure 18A:
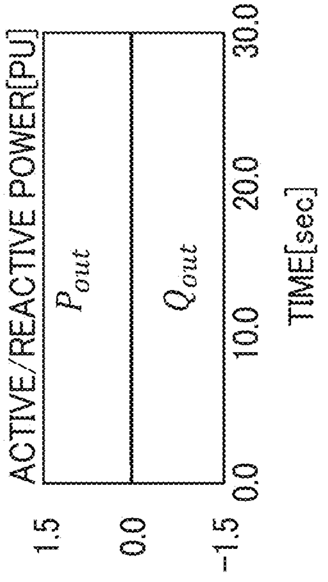
FIGS. 18A to 18E are diagrams to show results of numerical simulation.
Figure 18B:
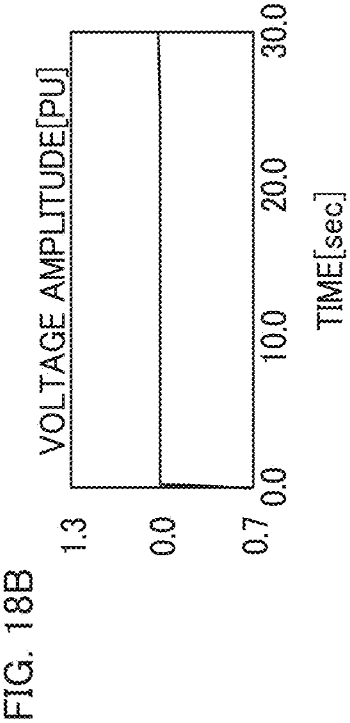
Figure 18C:
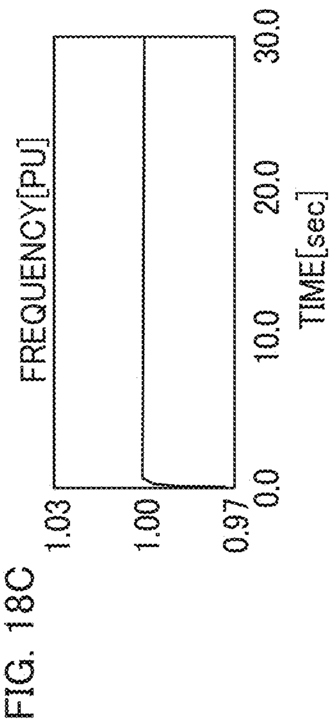
Figure 18D:
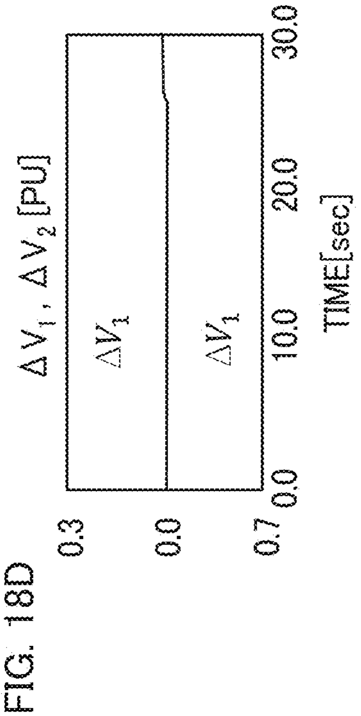
Figure 18E:
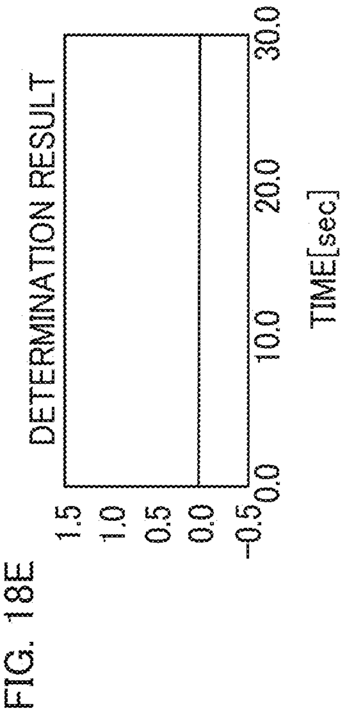
Figure 19A:
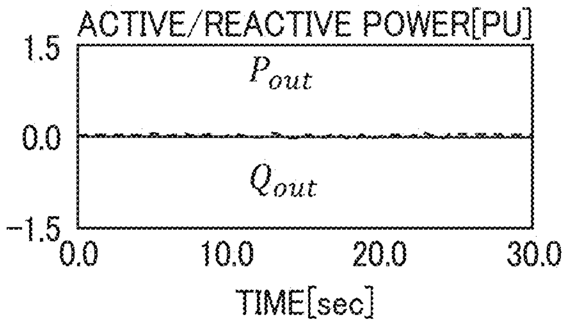
FIGS. 19A to 19E are diagrams to show results of numerical simulation.
Figure 19B:
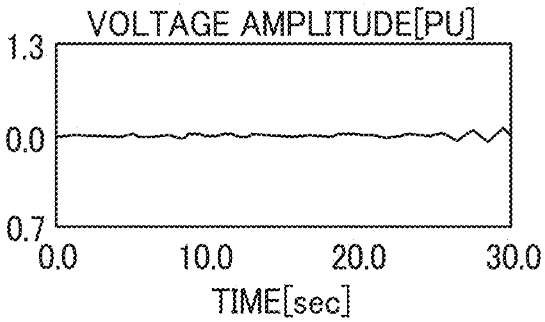
Figure 19C:
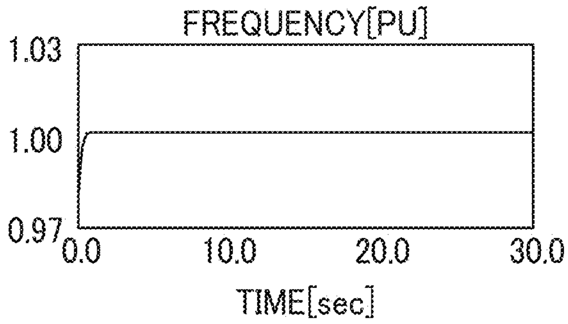
Figure 19D:
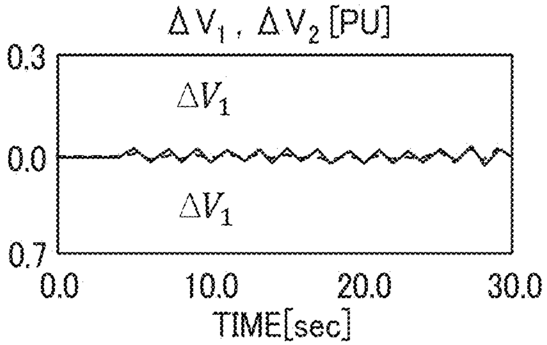
Figure 19E:
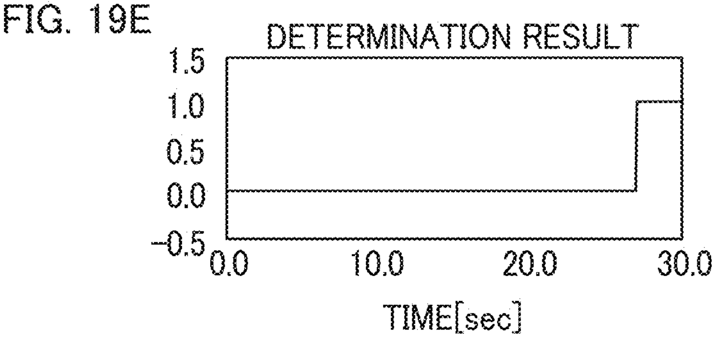

A power converter 9 of the present embodiment differs from the second embodiment in the interconnection point voltage amplitude control unit 62 of FIG. 9. FIG. 17 is a diagram to describe an interconnection point voltage amplitude control unit 92 of the present embodiment.

As described above, the smaller power consumed by the load G is, the less the voltage diverges. In such a case, in the processing executed by the islanding operation detection unit 62*j* of the embodiment above, there is a case where even when the power converter is in an islanding operation state, the voltage $\Delta V_2$ does not reach the upper and lower limit restriction in the restriction unit 62*g*.

According to the interconnection point voltage amplitude control unit 92 of the present variation, it is possible to detect an islanding operation state even in such a case.

The interconnection point voltage amplitude control unit 92 of the present embodiment further includes an adder 92*a* (corresponding to a "second addition unit"), as compared with the second embodiment.

The adder 92*a* outputs a voltage obtained by adding a certain modulation signal $V_{add}$ to an output of the change rate restriction unit 62*c*, when power consumption of the load G supplied with power from the power converter 9 is a certain value or less. In the present embodiment, the voltage $\Delta V_1$ input to the output unit 62*e* is the output of the adder 92*a*.

Here, the certain modulation signal $V_{add}$ is preferably a signal that causes a voltage output from the change rate restriction unit 62*c* to be $\Delta V_2$ having a sufficient amplitude for the processing executed by the islanding operation detection unit 62*j*. The modulation signal $V_{add}$ may be, for example, a sine wave, a triangular wave, or the like having a certain amplitude.

The effect of including the adder 92*a* will be described below by using results of numerical simulation.

<<Numerical Simulation Result>>

FIGS. 18 and 19 are results of the numerical simulation assuming the power converter 6 of the second embodiment and the power converter 9 of the present variation. First, the result shown in FIG. 18 for the power converter 6 of the second embodiment will be described.

In FIG. 18, (a), (b), (c), (d), and (e) correspond to the active power and reactive power, the voltage amplitude, the frequency, the voltage $\Delta V_1$ and voltage $\Delta V_2$, and a result of the determination by the determination unit 738, respectively. FIG. 18 assumes that power consumed by the load G is 0 (zero). Note that the same also applies to FIG. 19 described below.

In each of these diagrams, the horizontal axis corresponds to a time point [sec] and shows 0 [sec] to 30 [sec]. Each of these diagrams assume that the power converter is interconnected with the power system 1 at 0 [sec] to 25 [sec] and that the power converter transitions to an islanding operation state at 25 [sec].

Here, focusing particularly on the voltage $\Delta V_2$ in FIG. 18(*d*), the power converter 6 transitions to an islanding operation state, but the voltage $\Delta V_2$ transitions at almost 0 (zero) because of the load G not being sufficiently large.

Accordingly, the voltage $\Delta V_2$ does not reach the upper and lower limit restriction in the restriction unit 62*g* (FIG. 9). Thus, a result of the determination by the islanding operation detection unit 62*j* of FIG. 14(*e*) is always 0, and in spite of the transition to the islanding operation state, the islanding operation state is not detected.

Next, the result shown in FIG. 19 for the power converter 9 of the present embodiment will be described.

In particular, the voltage $\Delta V_1$ (solid line) in FIG. 19(*d*) transitions in a waveform of a triangular wave. On the other hand, the voltage $\Delta V_2$ (broken line) transitions at almost 0 (zero) until the transition to the islanding operation state at the time point 25 [sec], but transitions in a waveform of a triangular wave together with the voltage $\Delta V_1$ from the time point 25 [sec].

The determination result in FIG. 19(*e*) shows switching from 0 to 1 around a time point 26 [sec], which shows detection of the transition to the islanding operation state. This is because the voltage $\Delta V_2$ starts to transition in the waveform of the triangular wave together with the voltage $\Delta V_1$ at the time point 25 [sec].

Therefore, according to the power converter 9 of the present embodiment, it is possible to accurately detect whether the power converter 9 has transitioned to an islanding operation state even when power consumed by the load G is not sufficiently large.

SUMMARY

The power converter 2 according to the first embodiment is a power converter 2 capable of being interconnected with a power system 1 and including a virtual synchronous generator function, the power converter including: a frequency feedback unit 22*a* that outputs, after applying computation of a certain transfer function $G_O$ to frequency in the virtual synchronous generator function or a frequency of a voltage at an interconnection point to the power system 1, a processing result obtained by applying an upper and lower limit restriction to the resultant computation; an addition unit that outputs a second amplitude command value obtained by adding a certain first amplitude command value related to the voltage at the interconnection point to the processing result; an interconnection point voltage amplitude control unit 22 that generates an inverter output voltage amplitude command value, based on the second amplitude command value and an amplitude of the voltage at the interconnection point; a voltage output unit that generates a three-phase AC voltage, based on a phase and an output voltage amplitude in the virtual synchronous generator function; and an islanding operation detection unit 22*d* that detects, when the processing result reaches the upper and lower limit restriction, an islanding operation state in which the power converter 2 is separated from the power system 1, wherein the transfer function $G_O$ includes at least a second-order polynomial of a Laplace operator in a denominator and a first-order monomial of a Laplace operator in a numerator, and is given coefficients in the polynomial and the monomial such that a denominator of a closed-loop transfer function $G_C$ in a closed loop in a case where a change in a phase being an output of a virtual synchronous generator using active power as an input, a voltage amplitude change being a result obtained by performing computation of a certain transfer function using a frequency of the virtual synchronous generator or an interconnection point voltage frequency as an input, and an active power change caused by the phase change and the voltage amplitude change are collectively regarded as one closed-loop system becomes a stable polynomial when the power converter 2 is interconnected with the power system 1 and becomes an unstable polynomial when the power converter 2 is in islanding operation.

According to such a configuration, stability is maintained in the interconnection and instability occurs after transition to the islanding operation state, thereby allowing islanding operation to be detected.

In the power converter 2 according to the first embodiment, the coefficients in the polynomial and the monomial are set such that coefficients of terms included in a characteristic equation of the closed-loop transfer function $G_C$ have all the same sign when the power converter 2 is interconnected with the power system 1 and that a term with a sign different from a sign of a coefficient of another term occurs in the characteristic equation of the closed-loop transfer function $G_C$ when the power converter 2 is in the islanding operation. According to such a configuration, it is possible to easily achieve securing of stability in the interconnection and instability after transition to the islanding operation state.

In the power converter 2 according to the first embodiment, the transfer function $G_O$ includes the denominator being a second-order polynomial of a Laplace operator. According to such a setting, the number of independent parameters to be set can be suppressed, thereby simplifying setting of the parameters.

In the power converter 2 according to the first embodiment, the transfer function $G_O$ includes the denominator expressed by a square of a first-order polynomial of a Laplace operator. According to such a setting, the number of independent parameters to be set can be further suppressed, thereby further simplifying setting of the parameters.

The detection method according to the first embodiment is a detection method for detecting an islanding operation state in which a power converter 2 including virtual synchronous generator control and interconnected with a system is separated from a power system 1, wherein the power converter 2 includes: outputting, after applying computation of a certain transfer function $G_O$ to a frequency in the virtual synchronous generator function or a frequency of a voltage at an interconnection point to the power system 1, a processing result obtained by applying an upper and lower limit restriction to the resultant computation; outputting, by adding a certain first amplitude command value related to the voltage at the interconnection point and the processing result, a second amplitude command value, based on the second amplitude command value and an amplitude of the voltage at the interconnection point; generating a three-phase AC voltage, based on a phase and an output voltage amplitude in the virtual synchronous generator function; and detecting, when the processing result reaches the upper and lower limit restriction, an islanding operation state in which the power converter 2 is separated from the power system 1, and wherein the transfer function $G_O$ includes at least a second-order polynomial of a Laplace operator in a denominator and a first-order monomial of a Laplace operator in a numerator, and is given coefficients in the polynomial and the monomial such that a denominator of a closed-loop transfer function $G_C$ in a closed loop in a case where a change in a phase being an output of a virtual synchronous generator using active power as an input, a voltage amplitude change being a result obtained by performing computation of a certain transfer function using a frequency of the virtual synchronous generator or an interconnection point voltage frequency as an input, and an active power change caused by the phase change and the voltage amplitude change are collectively regarded as one closed-loop system becomes a stable polynomial when the power converter 2 is interconnected with the power system 1 and becomes an unstable polynomial when the power converter 2 is in islanding operation.

According to such a method, stability is maintained in the interconnection and instability occurs after transition to the islanding operation state, thereby allowing islanding operation to be detected.

The power converters 6, 7, 8, and 9 according to the second and third embodiments and Variations 2 and 3 are each a power converter capable of being interconnected with a power system 1 and including a virtual synchronous generator function, the power converter including: a frequency feedback unit 62*a* that outputs a voltage depending on one frequency out of a frequency $\omega$ in the virtual synchronous generator function and a frequency $\omega_{out}$ of a voltage at an interconnection point to the power system 1; a reactive power control unit 62*d* that outputs a voltage $\Delta V_q$ depending on reactive power at the interconnection point, an output unit 62*e* that outputs a voltage $\Delta V_2$ obtained by applying a first upper and lower limit restriction to a result of addition of a voltage $\Delta V_1$ based on the output of the frequency feedback unit 62*a* to the voltage $\Delta V_q$; 62*h* an adder that outputs an interconnection point voltage amplitude command value $V_{ref}$* obtained by adding a certain amplitude command value $V_{ref}$ related to the voltage at the interconnection point to the voltage $\Delta V_2$; an interconnection point voltage amplitude control unit 62** that generates an inverter output voltage amplitude command value $V_{INV}$, based on the interconnection point voltage amplitude command value $V_{ref}$* and an amplitude $V_{out}$ of the voltage at the interconnection point; a voltage output unit that generates a three-phase AC voltage, based on a phase $\theta$ in the virtual synchronous generator function and the inverter output voltage amplitude command value $V_{INV}$; and an islanding operation detection unit 62*j* that detects, when the voltage $\Delta V_2$ reaches the first upper and lower limit restriction, an islanding operation state in which the power converter is separated from the power system 1. The frequency feedback unit 62*a* outputs, when the power converter is in the islanding operation state, a voltage with an increased width of change caused by change in the one frequency, and the reactive power control unit 62*d* outputs, when the power converter is interconnected with the power system 1, the voltage $\Delta V_q$ for suppressing change in the reactive power at the interconnection point caused by change in the frequency.

According to such a configuration, in a state where the power converter is interconnected with the power system 1, it is possible to prevent occurrence of erroneous detection of transition to the islanding operation state in a case where the frequency changes for some reason. Thus, it is possible to accurately detect whether the power converter has transitioned to an islanding operation state.

In the power converter above, the frequency feedback unit 62*a* outputs, when the power converter is in the islanding operation state, a voltage with an increased width of change caused by change in the one frequency, and the reactive power control unit 62*d* outputs, when the power converter is interconnected with the power system 1, the voltage $\Delta V_q$ for suppressing change in the reactive power at the interconnection point caused by change in the frequency. According to such a configuration, it is possible to more accurately detect whether the power converter has transitioned to an islanding operation state.

The power converter above may further include an upper and lower limit restriction unit 62*b* that outputs a voltage obtained by applying a second upper and lower limit restriction to the output of the frequency feedback unit 62*a*, and the voltage $\Delta V_1$ may be a voltage based on the output of the upper and lower limit restriction unit 62*b*. According to such a configuration, an amplitude of the voltage $\Delta V_1$ is limited, thereby allowing the voltage $\Delta V_q$ to easily follow change in the voltage $\Delta V_1$ (in other words, allowing the voltage $\Delta V_q$ to cancel the voltage $\Delta V_1$ without difficulty). Thus, it is possible to more effectively prevent occurrence of erroneous detection of transition to the islanding operation state.

The power converter above may further include a change rate restriction unit 62*c* that outputs a voltage obtained by applying an upper limit restriction of a time change rate to the output of the upper and lower limit restriction unit 62*b*, and the voltage $\Delta V_1$ may be a voltage based on the output of the change rate restriction unit 62*c*. According to such a configuration, a time change rate of the voltage $\Delta V_1$ is limited, thereby allowing the voltage $\Delta V_q$ to more easily follow change in the voltage $\Delta V_1$ (in other words, allowing the voltage $\Delta V_1$ to be easily canceled). Thus, it is possible to more effectively prevent occurrence of erroneous detection of transition to the islanding operation state.

In the power converter above, the islanding operation detection unit 62*j* detects that the power converter is in the islanding operation state, based on the voltage $\Delta V_1$ and the voltage $\Delta V_2$. According to such a configuration, even when it is difficult to determine whether the power converter has transitioned to an islanding operation state due to lack of sufficient amplitudes of the voltage $\Delta V_1$ and the voltage $\Delta V_2$, it is possible to accurately determine the transition.

In the power converter above, the islanding operation detection unit 62*j* may detect that the power converter is in the islanding operation state, based on transition of the voltage $\Delta V_1$ and transition of a ratio between the voltage $\Delta V_1$ and the voltage $\Delta V_1$. According to such a configuration, even when it is difficult to determine whether the power converter has transitioned to an islanding operation state due to lack of sufficient amplitudes of the voltage $\Delta V_1$ and the voltage $\Delta V_2$, it is possible to more accurately determine the transition.

In the power converter above, the islanding operation detection unit 62*j* may detect that the power converter is in the islanding operation state, based on transition of the second voltage and a degree of similarity between transition of the voltage $\Delta V_1$ and transition of the voltage $\Delta V_2$. According to such a configuration, even when it is difficult to determine whether the power converter has transitioned to an islanding operation state due to lack of sufficient amplitudes of the voltage $\Delta V_1$ and the voltage $\Delta V_2$, it is possible to more accurately determine the transition.

The power converter above may further include an adder 92*a* that outputs a voltage obtained by adding a certain modulation signal to the output of the change rate restriction unit 62*c*, when power consumption of a load supplied with power from the power converter is a certain value or less, and the second voltage may be the output of the second addition unit. According to such a configuration, even when it is difficult to determine whether the power converter has transitioned to an islanding operation state due to lack of sufficiently large power consumed by the load G, it is possible to more accurately determine the transition.

The embodiments above are presented as examples of the disclosure and are not intended to limit the scope of the disclosure. Various omissions, replacements, and changes can be made on the configurations above without departing from the scope of the disclosure. The embodiments above and variations thereof are included in the scope and gist of the disclosure, and are included in the disclosure described in the claims and the equivalents thereof.

The invention claimed is:

1. A power converter configured to be interconnected with a power system and to perform virtual synchronous generator function, the power converter comprising:

a processor, and a non-transitory storage medium having program instructions stored thereon, execution of which by the processor causes the power converter to provide functions of a frequency feedback unit configured to apply a transfer function to one of a frequency in the virtual synchronous generator function, or a frequency of a voltage at an interconnection point of the power converter to the power system, and apply an upper and lower limit restriction to a result of the application of the transfer function, to thereby generate a processing result;

an addition unit configured to output, by adding a first amplitude command value related to the voltage at the interconnection point and the processing result, a second amplitude command value;

an interconnection point voltage amplitude control unit configured to generate an inverter output voltage amplitude command value, based on the second amplitude command value and an amplitude of the voltage at the interconnection point;

a voltage output unit configured to generate a three-phase Alternating Current (AC) voltage, based on a phase for the virtual synchronous generator function and the inverter output voltage amplitude command value; and an islanding operation detection unit configured to detect, responsive to the processing result reaching the upper and lower limit restriction, an islanding operation state in which the power converter is separated from the power system, wherein the transfer function has:

a denominator that includes at least a second-order polynomial of a Laplace operator, and a numerator that includes a first-order monomial of the Laplace operator, the polynomial and the monomial being so configured that the denominator is a stable polynomial when the power converter is interconnected with the power system and is an unstable polynomial when the power converter is the in islanding operation state.

2. The power converter according to claim 1, wherein the transfer function includes a characteristic equation that has a first term and a second term, and the polynomial and the monomial are so configured that coefficients of the first and second terms have a same sign when the power converter is interconnected with the power system, and have different signs when the power converter is in the islanding operation state.

3. The power converter according to claim 1, wherein the denominator of the transfer function includes only the second-order polynomial of the Laplace operator.

4. The power converter according to claim 3, wherein the denominator of the transfer function is expressed by a square of the first-order polynomial of the Laplace operator.

5. A detection method for detecting an islanding operation state of a power converter configured to be interconnected with a power system and to perform virtual synchronous generator function, the power converter being separated from the power system in the islanding operation state, the detection method comprising, performed by the power converter that includes a processor:

applying a transfer function to one of a frequency in the virtual synchronous generator function, or a frequency of a voltage at an interconnection point of the power converter to the power system, and applying an upper and lower limit restriction to a result of the application of the transfer function, to thereby generate a processing result;

outputting, by adding a first amplitude command value related to the voltage at the interconnection point and the processing result, a second amplitude command value;

generating an inverter output voltage amplitude command value, based on the second amplitude command value and an amplitude of the voltage at the interconnection point;

generating a three-phase Alternating Current (AC) voltage, based on a phase for the virtual synchronous generator function and the inverter output voltage amplitude command value; and detecting, responsive to the processing result reaching the upper and lower limit restriction, the islanding operation state, wherein the transfer function has:

a denominator that includes at least a second-order polynomial of a Laplace operator, and a numerator that includes a first-order monomial of the Laplace operator, the polynomial and the monomial being so configured that the denominator is a stable polynomial when the power converter is interconnected with the power system and is an unstable polynomial when the power converter is in the islanding operation state.

6. A power converter configured to be interconnected with a power system and to perform virtual synchronous generator function, the power converter comprising:

a processor, and a non-transitory storage medium having program instructions stored thereon, execution of which by the processor causes the power converter to provide functions of a frequency feedback unit configured to output a voltage depending on one of a frequency in the virtual synchronous generator function, and a frequency of a voltage at an interconnection point of the power converter to the power system;

a reactive power control unit configured to output a first voltage depending on reactive power at the interconnection point;

an output unit configured to apply a first upper and lower limit restriction to a result of addition of a second voltage based on the output of the frequency feedback unit and the first voltage, to thereby output a third voltage;

a first addition unit configured to output, by adding a first amplitude command value related to the voltage at the interconnection point and the third voltage, a second amplitude command value;

an interconnection point voltage amplitude control unit configured to generate an inverter output voltage amplitude command value, based on the second amplitude command value and an amplitude of the voltage at the interconnection point;

a voltage output unit configured to generate a three-phase Alternating Current (AC) voltage, based on a phase for the virtual synchronous generator function and the inverter output voltage amplitude command value; and an islanding operation detection unit configured to detect, responsive to the third voltage reaching the first upper and lower limit restriction, an islanding operation state in which the power converter is separated from the power system.

7. The power converter according to claim 6, wherein the frequency feedback unit outputs, when the power converter is in the islanding operation state, a voltage with an increased width of change caused by change in the one frequency, and the reactive power control unit outputs, when the power converter is interconnected with the power system, the first voltage for suppressing change in the reactive power at the interconnection point.

8. The power converter according to claim 6, wherein the frequency feedback unit applies a transfer function to the one frequency, and the transfer function is so determined such that stability of the power system is maintained when the power converter is interconnected with the power system and instability occurs in the islanding operation state.

9. The power converter according to claim 6, the execution of the program instructions by the processor causes the power converter to further provide functions of:

an upper and lower limit restriction unit configured to output a voltage obtained by applying a second upper and lower limit restriction to the output of the frequency feedback unit, wherein the second voltage is a voltage based on the output of the upper and lower limit restriction unit.

10. The power converter according to claim 9, the execution of the program instructions by the processor causes the power converter to further provide functions of:

a change rate restriction unit configured to output a voltage obtained by applying an upper limit restriction of a time change rate to the output of the upper and lower limit restriction unit, wherein the second voltage is a voltage based on the output of the change rate restriction unit.

11. The power converter according to claim 6, wherein the islanding operation detection unit detects that the power converter is in the islanding operation state, based on the second voltage and the third voltage.

12. The power converter according to claim 11, wherein the islanding operation detection unit detects that the power converter is in the islanding operation state, based on transition of the second voltage and transition of a ratio between the second voltage and the third voltage.

13. The power converter according to claim 11, wherein the islanding operation detection unit detects that the power converter is in the islanding operation state, based on transition of the second voltage and a degree of similarity between transition of the second voltage and transition of the third voltage.

14. The power converter according to claim 10, the execution of the program instructions by the processor causes the power converter to further provide functions of:

a second addition unit configured to output a voltage obtained by adding a modulation signal to the output of the change rate restriction unit, when power consumption of a load supplied with power from the power converter is a value or less, wherein the second voltage is the output of the second addition unit.

* * * * *